(12) United States Patent  (10) Patent No.: US 8,466,380 B2
Inoue et al.  (45) Date of Patent: Jun. 18, 2013

(54) APPARATUS AND METHOD FOR MEASURING ARTICLES INCLUDING CONVEYOR-WEIGHERS SUPPORTED ON WEIGHING UNIT

(75) Inventors: Yuichi Inoue, Saitama-ken (JP); Fumio Morisawa, Tokyo (JP)

(73) Assignee: Teraoka Seiko Co., Ltd., Tokyo (JP)

( * ) Notice: Subject to any disclaimer, the term of this patent is extended or adjusted under 35 U.S.C. 154(b) by 506 days.

(21) Appl. No.: 12/619,136

(22) Filed: Nov. 16, 2009

(65) Prior Publication Data

US 2010/0126780 A1  May 27, 2010

(30) Foreign Application Priority Data

Nov. 27, 2008 (JP) ................................. 2008-302881
Jan. 29, 2009 (JP) ................................. 2009-18630
Mar. 19, 2009 (JP) ................................. 2009-67193

(51) Int. Cl.
*G01G 11/00* (2006.01)
*G01B 11/02* (2006.01)
*G01B 11/24* (2006.01)

(52) U.S. Cl.
USPC ......... 177/25.13; 177/145; 702/159; 702/175

(58) Field of Classification Search
USPC ................... 177/145, 25.11, 25.13, 119, 199, 177/200; 367/99, 128; 702/158, 159, 175
See application file for complete search history.

(56) References Cited

U.S. PATENT DOCUMENTS

| | | | | |
|---|---|---|---|---|
| 3,588,480 A | * | 6/1971 | Unger | 702/156 |
| 5,220,536 A | * | 6/1993 | Stringer et al. | 367/99 |
| 5,850,370 A | * | 12/1998 | Stringer et al. | 367/128 |
| 5,878,379 A | * | 3/1999 | Dlugos et al. | 702/156 |
| 5,990,422 A | * | 11/1999 | Komori et al. | 177/25.11 |
| 6,064,629 A | * | 5/2000 | Stringer et al. | 367/128 |
| 6,433,288 B1 | * | 8/2002 | Olafsson | 177/145 |
| 6,553,331 B2 | * | 4/2003 | Sakagami | 702/175 |
| 6,850,464 B2 | * | 2/2005 | Carlsruh et al. | 367/99 |
| 7,279,645 B1 | * | 10/2007 | Inglin et al. | 177/145 |
| 7,405,368 B2 | * | 7/2008 | Beck et al. | 177/25.13 |
| 7,586,049 B2 | * | 9/2009 | Wurz | 177/25.13 |
| 7,592,552 B2 | * | 9/2009 | Duppre | 177/25.13 |

FOREIGN PATENT DOCUMENTS

| | | | |
|---|---|---|---|
| JP | 6-50721 | | 2/1994 |
| JP | 10-122940 | | 5/1998 |
| JP | 2005-187170 A | * | 7/2005 |
| JP | 2010-151778 A | * | 7/2010 |

* cited by examiner

*Primary Examiner* — Randy W Gibson
(74) *Attorney, Agent, or Firm* — Greenblum & Bernstein, P.L.C.

(57) ABSTRACT

An apparatus for measuring articles includes a conveying part, a plurality of measuring parts and a determining part. The conveying part includes a plurality of conveyers placed adjacently in series for conveying articles successively in a straight line. The plurality of measuring parts measure weight or dimensions of the respective articles successively conveyed by the conveying part. The determining part determines the weight or the dimensions of the respective articles based on the measured values by the plurality of the measuring parts.

17 Claims, 25 Drawing Sheets

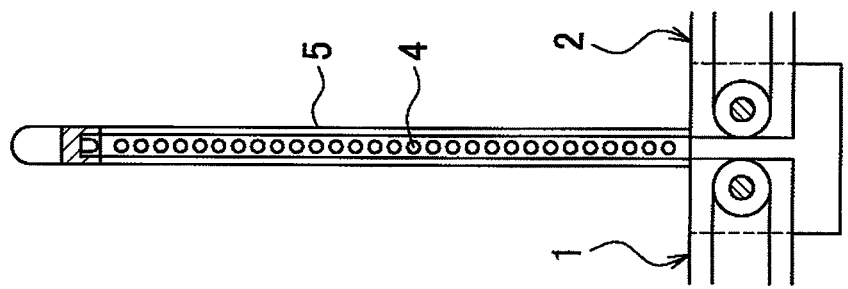
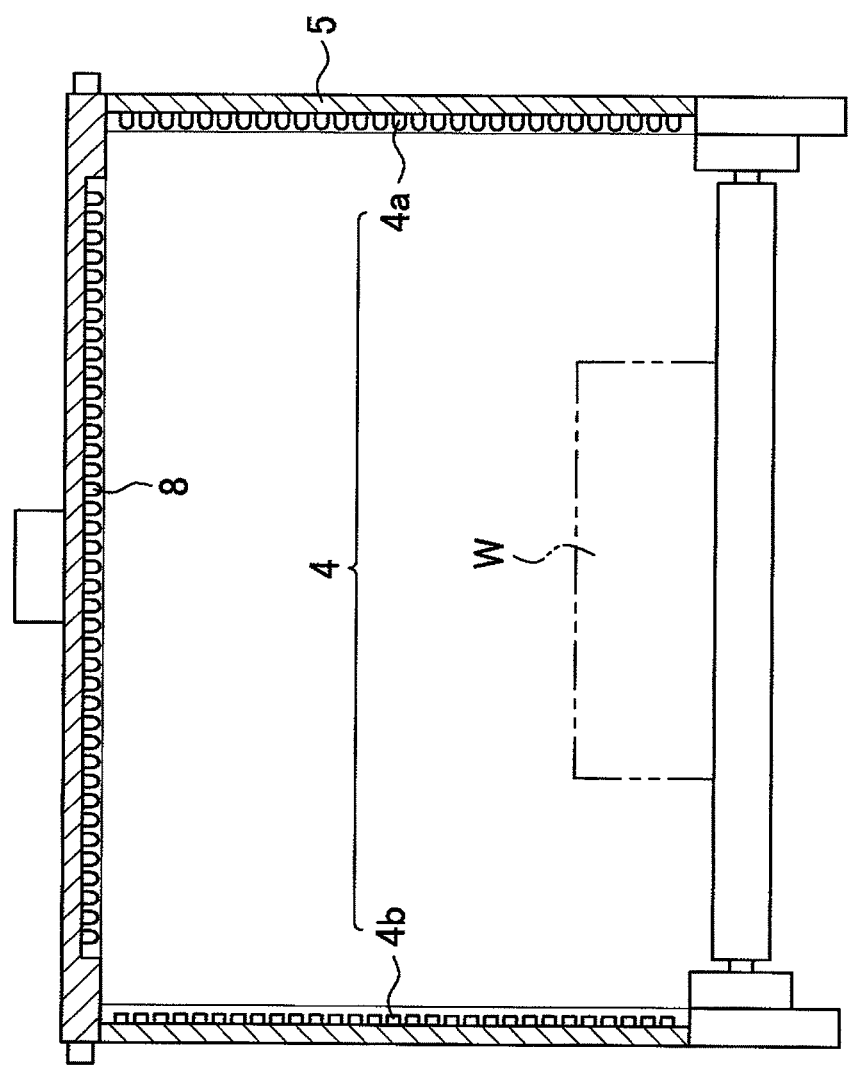

FIG.6

[ARTICLE DATA]

| ARTICLE CODE | JAN CODE | ARTICLE TITLE | UNIT | STORAGE RACK No. | ... |
|---|---|---|---|---|---|
| 000001 | 4912345678904 | ○○○○ | PIECE | 011232 | ... |
| 000002 | 4912345678911 | ×××× | PIECE | 025489 | ... |
| 000003 | 4912345678928 | △△△△ | PIECE | 036545 | ... |
| 000004 | 4912345678935 | ●●●● | CASE | 410203 | ... |
| 000005 | 4912345678942 | ▲▲▲▲ | CASE | 450108 | ... |
| ... | ... | ... | ... | ... | ... |

FIG.7

[SHIPPING DATA]

| SHIPMENT No. | SHIP-TO NAME | SHIPPNG ROUTE | CONSOLID. STN | ZIP | ADDRESS | TEL. | ... |
|---|---|---|---|---|---|---|---|
| 110001 | ○○ | 1021 | 1001 | 141-0032 | TOKYO... | 03-1234-5678 | ... |
| 210001 | ×× | 2111 | 2002 | 002-8071 | HOKKAIDO... | 011-234-5678 | ... |
| 320001 | △△ | 3211 | 3003 | 563-0022 | OSAKA... | 072-234-5678 | ... |
| ... | | | | | | ... | |

FIG.8

[SHIPPING OPERATION DATA]

| SHIP ID | DETAILED No. | SHIPMENT No. | SHIP-TO NAME | DELIVERY DATE | ARTICLE CODE | JAN CODE | ARTICLE NAME | NR. OF SHIPMENT | NR. OF RESULTS | COMPLET FLAG | |
|---|---|---|---|---|---|---|---|---|---|---|---|
| 0001 | 1-12 | 110001 | ○○ | 2008/09/29 | 000002 | 4912345678911 | ××× | 12 | 0 | 0 | ... |
| 0002 | 1 | 110001 | ○○ | 2008/09/29 | 000004 | 4912345678935 | ●●● | 1 | 0 | 0 | ... |
| 0003 | 1 | 110001 | ○○ | 2008/09/29 | 000005 | 4912345678942 | ▲▲▲▲ | 1 | 0 | 0 | ... |
| 0004 | 1-8 | 210001 | ×× | 2008/09/29 | 000001 | 4912345678904 | ○○○○ | 8 | 8 | 1 | ... |
| 0005 | 1-5 | 210001 | ×× | 2008/09/29 | 000002 | 4912345678911 | ×××× | 5 | 5 | 1 | ... |
| 0006 | 1-6 | 210001 | ×× | 2008/09/29 | 000003 | 4912345678928 | △△△△ | 6 | 4 | 0 | ... |
| ... | ... | ... | ... | ... | ... | ... | ... | ... | ... | ... | ... |

CLASSIFICATION: 0 = NORMAL, 1 = HOLD    COMPLETION FLAG: 0 = OPERATION UNCOMPLETED, 1 = OPERATION COMPLETED

FIG.9

[SCALE SELECTION DATA]

| SCALE No. | LENGTH LIMIT 1 | LENGTH LIMIT 2 | JUDGEMENT | ... |
|---|---|---|---|---|
| 1 |  | 440mm | UNDER | ... |
| 2 | 441mm | 1050mm | WITHIN | ... |
| 3 | 1051mm |  | OVER | ... |
| ... | ... | ... | ... | ... |

FIG.10

[WEIGHING DATA] Measured weights when measuring successively conveyed articles 1051mm or more in length and 50 Kg in weight

| SCALE No. | TIME 1 | | TIME 2 | | TIME 3 | | TIME 4 | | TIME 5 | | TIME 6 | | ... |
|---|---|---|---|---|---|---|---|---|---|---|---|---|---|
| 1 | 48956g | 0001-1 | 49899g | 0001-1 | 48956g | 0001-2 | 49899g | 0001-2 | 48956g | 0001-3 | 49899g | 0001-3 | ... |
| 2 | 48768g | 0001-1 | 49689g | 0001-1 | 48768g | 0001-2 | 49689g | 0001-2 | 48768g | 0001-3 | 49689g | 0001-3 | ... |
| 3 | 49945g | 0001-1 | 50000g | 0001-1 | 49945g | 0001-2 | 50000g | 0001-2 | 49945g | 0001-3 | 50000g | 0001-3 | ... |
| ... | ... | ... | ... | ... | ... | ... | ... | ... | ... | ... | ... | ... | ... |
| | ARTICLE 1 | | | | ARTICLE 2 | | | | ARTICLE 3 | | | | |

According to measured weights above, the values of scale number 3 at time 2, 4, and 6 are adopted as weights of respective articles

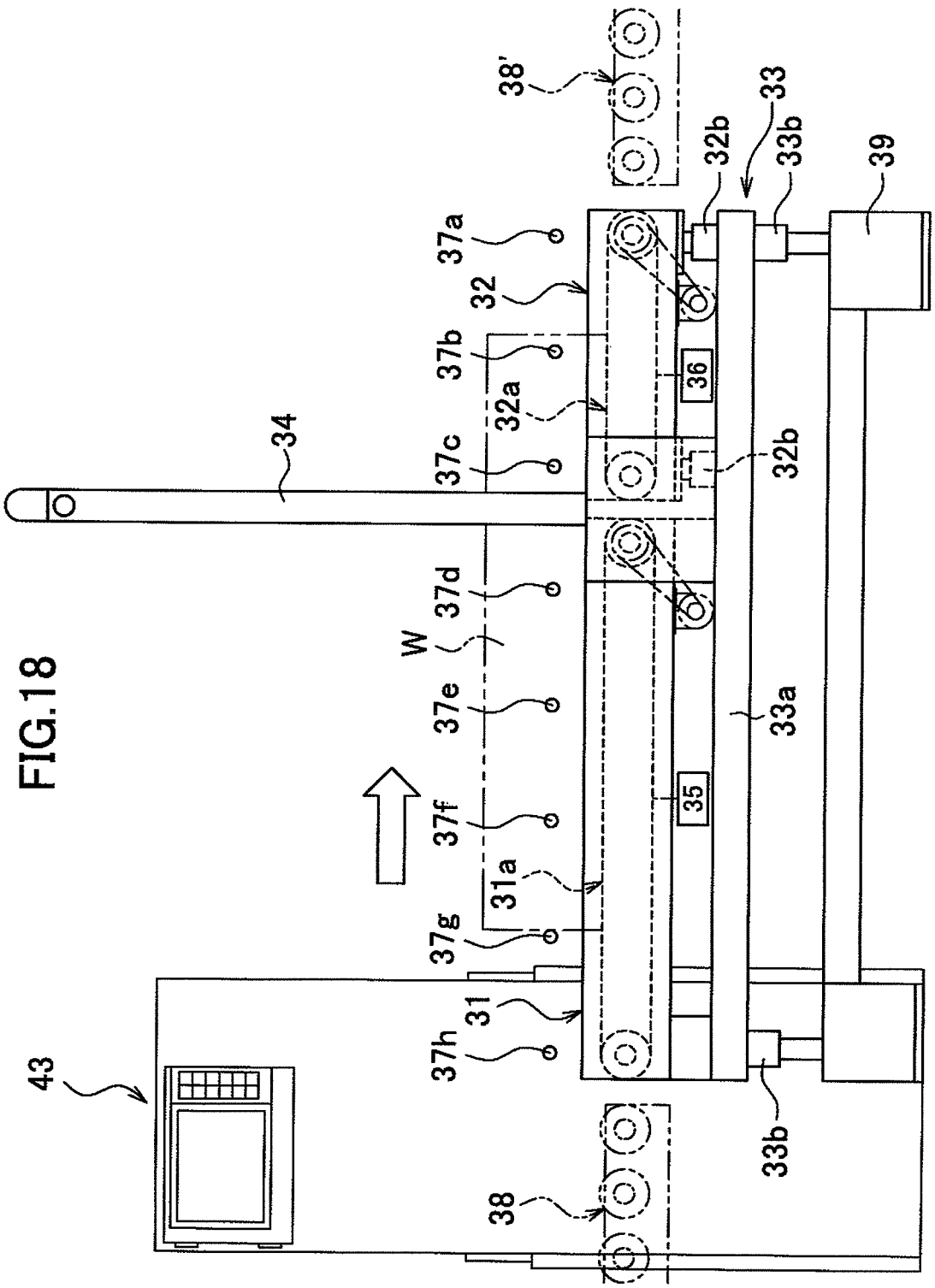

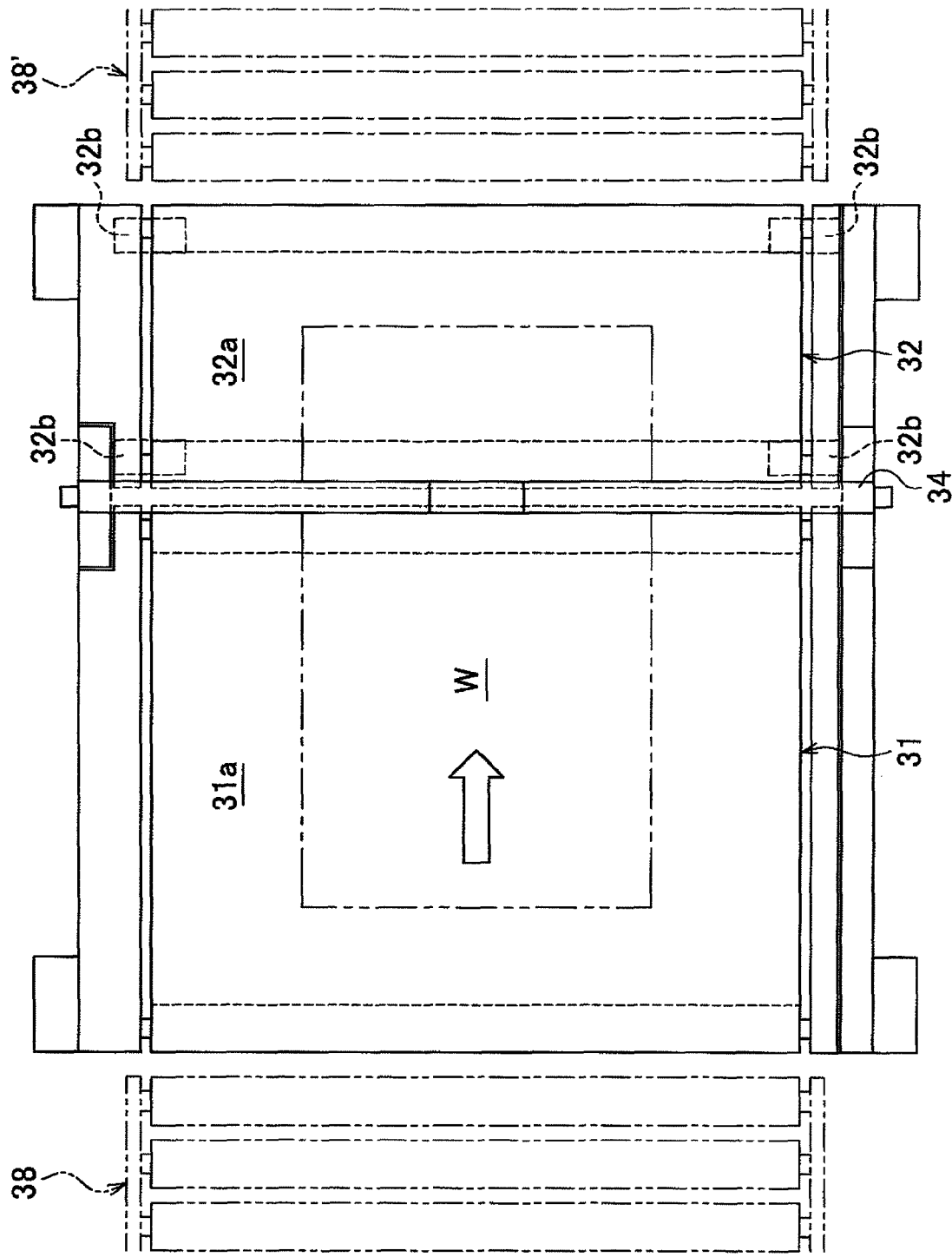

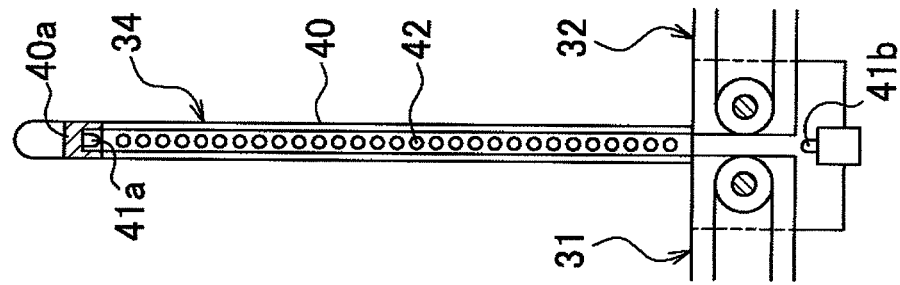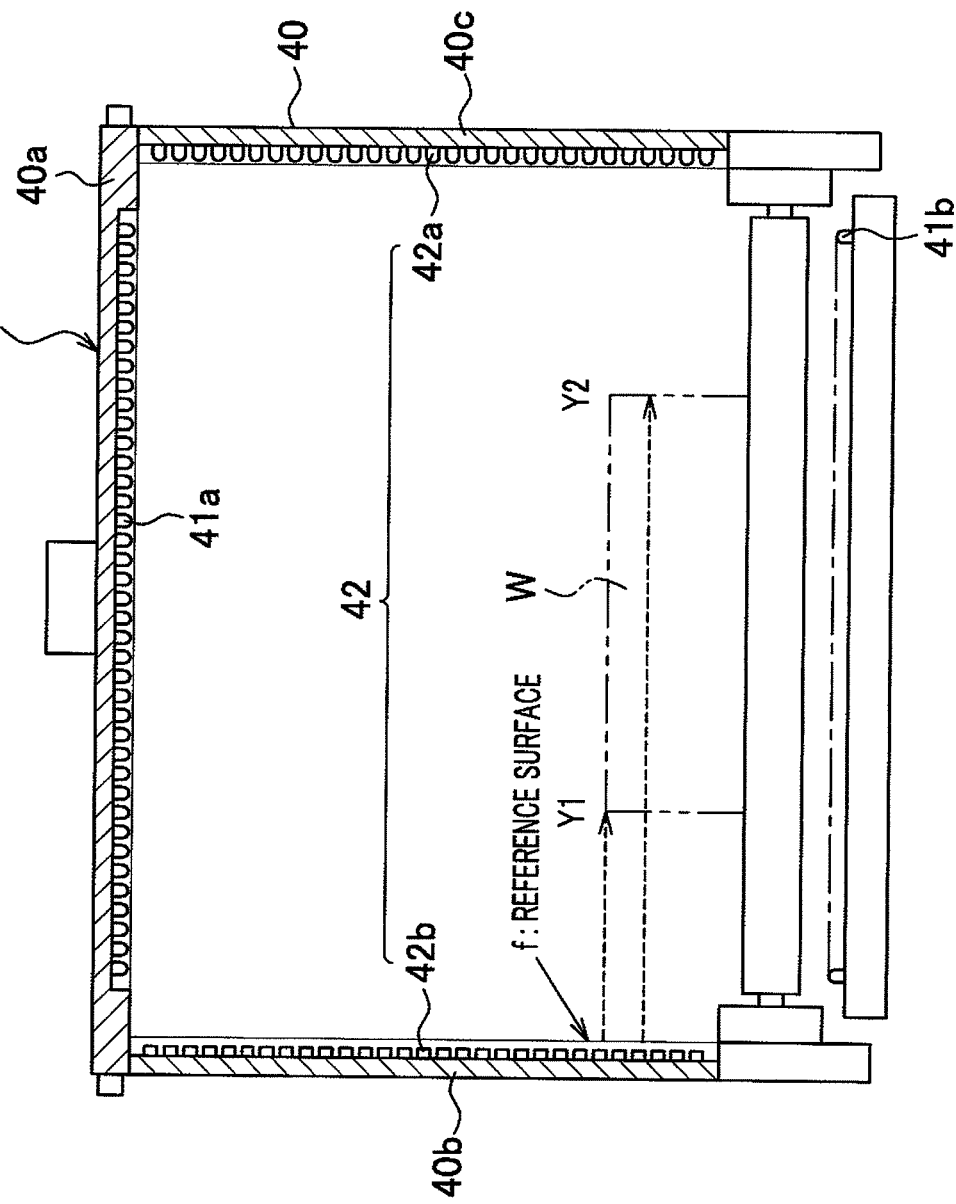

FIG.25

[DETECTION TABLE]

| LINE No. | COORDINATE X1 | COORDINATE Y1 | COORDINATE X2 | COORDINATE Y2 | COUNT NR. 1 | (SELECTION) | COUNT NR. 2 | WEIGHT VALUE 1 (32b) | WEIGHT VALUE 2 (33b) |
|---|---|---|---|---|---|---|---|---|---|
| 1 | 1 | 4 | 1 | 4 | 220 | Encoder1 | 220 | 0 | 50 |
| 2 | 2 | 3.83 | 2 | 9 | 222 | Encoder1 | 220 | 5 | 50 |
| 3 | 3 | 3.67 | 3 | 16 | 220 | Encoder1 | 220 | 15 | 50 |
| 4 | 4 | 3.49 | 4 | 15.83 | 220 | Encoder1 | 220 | 20 | 50 |
| 5 | 5 | 3.33 | 5 | 15.66 | 220 | Encoder1 | 220 | 25 | 50 |
| 6 | 6 | 3.17 | 6 | 15.49 | 222 | Encoder2 | 220 | 25 | 50 |
| 7 | 7 | 2.99 | 7 | 15.33 | 222 | Encoder2 | 220 | 25 | 50 |
| 8 | 8 | 2.83 | 8 | 15.17 | 220 | Encoder2 | 221 | 25 | 50 |
| 9 | 9 | 2.66 | 9 | 14.99 | 220 | Encoder2 | 220 | 25 | 50 |
| 10 | 10 | 2.49 | 10 | 14.83 | 220 | Encoder2 | 220 | 25 | 50 |
| 11 | 11 | 2.33 | 11 | 14.66 | 220 | Encoder2 | 220 | 25 | 50 |
| 12 | 12 | 2.16 | 12 | 14.49 | 220 | Encoder2 | 220 | 24 | 48 |
| 13 | 13 | 7.80 | 13 | 14.33 | 220 | Encoder2 | 220 | 22 | 47 |
| 14 | 14 | 14 | 14 | 14 | 220 | Encoder2 | 220 | 20 | 45 |

APPARATUS AND METHOD FOR MEASURING ARTICLES INCLUDING CONVEYOR-WEIGHERS SUPPORTED ON WEIGHING UNIT

FIELD OF THE INVENTION

The invention is related to an apparatus for measuring articles and its method of measuring especially for measuring the weight and dimensions of the respective articles being successively conveyed and its method of measuring.

BACKGROUND OF THE INVENTION

Articles are commonly conveyed and weighed by a so-called single-scale type apparatus that is a conveying-weighing apparatus having a single conveyer with a weighing device (scale). However, the apparatus requires no more than one article placed and conveyed on the conveyer by adjusting a distance between articles to measure an exact weight for respective articles. Accordingly, it is difficult for the single-scale type apparatus to handle a wide variety of articles that are conveyed automatically in succession.

Therefore, the market expects a novel conveying-weighing apparatus capable of quickly measuring correct weights of articles successively conveyed and improving efficiency of feeding and capacity of weighing of articles as a measuring apparatus that conveys and weighs a plurality of articles with different lengths.

There is also known an article measuring apparatus provided with a length measuring part for measuring the article length in a conveying direction with optical means, a width measuring part for measuring the article width and the locations orthogonally to the conveying direction with optical means, an obliquity angle measuring part for measuring the obliquity angle of the article based on a plurality of locations of the article measured by the width measuring part for a given distance of the article in the conveying direction and a calculation part for calculating the length and width of the article by using the length measured by the length measuring part, the width measured by the width measuring part and the obliquity angle measured by the obliquity angle measuring part.

SUMMARY OF THE INVENTION

According to one aspect of an embodiment of the invention, there is provided an article measuring apparatus that includes a conveying part having a plurality of conveyers placed adjacently in series for conveying articles successively in a straight line. The apparatus has a plurality of measuring parts for measuring weight or dimensions of the respective articles successively conveyed by the conveyers. The apparatus has a determining part for determining the weight or the dimensions of the respective articles based on values measured by the plurality of the measuring parts.

According to another aspect of an embodiment of the invention, there is provided an article measuring apparatus wherein the plurality of the measuring parts include a plurality of weighing devices for weighing the articles while the articles are conveyed by the conveyers. The conveying part includes a weighing unit. The conveying part includes two or more conveying-weighing units. The two or more conveying-weighing units are arranged over the weighing unit. The respective conveying-weighing units include a weighing device and a conveyer. The respective conveyers are adjacently arranged with one another in series for conveying the articles successively in a straight line. The conveying part includes a sensor unit for measuring the lengths of the respective articles conveyed by the conveyers.

The determining part includes a selection part for selecting one of the values outputted respectively from the conveying-weighing units and the weighing unit according to the lengths of the respective articles measured by the sensor unit.

According to still another aspect of an embodiment of the invention, there is provided an article measuring apparatus wherein the plurality of the measuring parts include a plurality of weighing devices for weighing the respective articles while the articles are conveyed by the conveyers. The conveying part includes a weighing unit. The conveying part includes a conveying unit and a conveying-weighing unit. The conveying unit and the conveying-weighing unit are arranged over the weighing unit. The conveying unit and the conveying-weighing unit are adjacently in series for conveying the articles successively in a straight line. The conveying-weighing unit includes a conveyer and a weighing device. The conveying part includes a sensor unit for measuring the lengths of the respective articles conveyed by the conveying unit and the conveying-weighing unit.

The determining part includes a selection part for selecting one of the values outputted respectively from the conveying-weighing unit and the weighing unit according to the lengths of the respective articles measured by the sensor unit.

According to another aspect of an embodiment of the invention, there is provided an article measuring apparatus wherein the plurality of the measuring parts includes a plurality of article detection sensors arranged at predetermined intervals along a moving direction of the conveyers to detect the articles conveyed by the conveyers. The plurality of the measuring parts include a sensor unit for detecting locations of both lateral sides of the articles being conveyed. The plurality of the measuring parts include a memory for storing the locations of the lateral sides of an article according to signals detected at regular time intervals by the sensor unit during the time from a detection of the article by a first article detection sensor to a detection of the same article by a second next article detection sensor corresponding to a distance between the first and second article detection sensors, until the sensor unit no longer detects the lateral sides of the article. The determining part includes a dimension calculation part for calculating dimensions of the article based on the data stored in the memory.

According to another aspect of an embodiment of the invention, there is provided an article measuring apparatus wherein the conveying part further includes a device for generating pulse signals synchronized with the movement of the conveyers. The conveying part further includes a counter part which counts the pulse signals during the time when the sensor unit detects an article and stores in the memory the locations of both lateral sides of the article corresponding to the count number of the pulse signals based on the distance between both article detection sensors every time an article detection sensor detects the article.

According to another aspect of an embodiment of the invention, there is provided a method of measuring an article. The method includes conveying articles successively in a straight line by two or more conveyers arranged adjacently in series. The method includes measuring weight or dimensions of the respective articles conveyed by the conveyers using a plurality of measuring parts. The method includes determining weight or dimensions of the respective articles based on the values measured by the plurality of the measuring parts.

According to another aspect of an embodiment of the invention, there is provided a method of measuring an article.

The method includes weighing respective articles being conveyed by conveyers using a plurality of weighing devices. The method includes conveying articles successively in a straight line by two or more conveyers arranged adjacently in series over a weighing unit having one of said plurality of weighing devices. The method includes measuring the length of the respective articles conveyed by the conveyers using a sensor unit. The method includes selecting one of values outputted respectively from the plurality of the weighing devices according to the length of the respective articles measured by the sensor unit.

According to another aspect of an embodiment of the invention, there is provided a method of measuring an article. The method includes detecting an article conveyed by conveyers using a plurality of article detection sensors arranged at regular intervals along the moving direction of the conveyers. The method includes detecting locations of both lateral sides of the article conveyed by the conveyers using a sensor unit. The method includes storing in a memory the locations of lateral sides of the article based on signals detected at regular time intervals by the sensor unit during the time from a detection of the article by a first article detection sensor to a detection of the same article by a second next article detection sensor corresponding to a distance between the first and second article detection sensors, until the sensor unit no longer detects the lateral sides of the article. The method includes calculating dimensions of the article based on the data stored in the memory.

BRIEF DESCRIPTION OF THE DRAWINGS

FIG. 4 is a sectional view showing a gate sensor for measuring a length of an article, wherein (a) is a vertically sectional side view and (b) is a vertically sectional front view, respectively.
FIG. 6 shows article data stored in a RAM.
FIG. 7 shows shipment data stored in a RAM.
FIG. 8 shows shipping operation data stored in a RAM.
FIG. 9 shows scales selection data stored in a RAM.
FIG. 10 shows examples of measured weights stored in a RAM.

FIG. 18 is a front view of an apparatus for measuring an article used in a manner in accordance with one embodiment of the invention.
FIG. 19 is a plan view of the same.
FIG. 21 is a sectional view showing a gate sensor for measuring locations of lateral sides of an article, wherein (a) is a vertically sectional side view and (b) is a vertically sectional front view, respectively.
FIG. 25 is a detection table stored in a RAM.

DETAILED DESCRIPTION

Exemplary embodiments will be described in detail with reference to the drawings.

Embodiment 1

Figure 1:
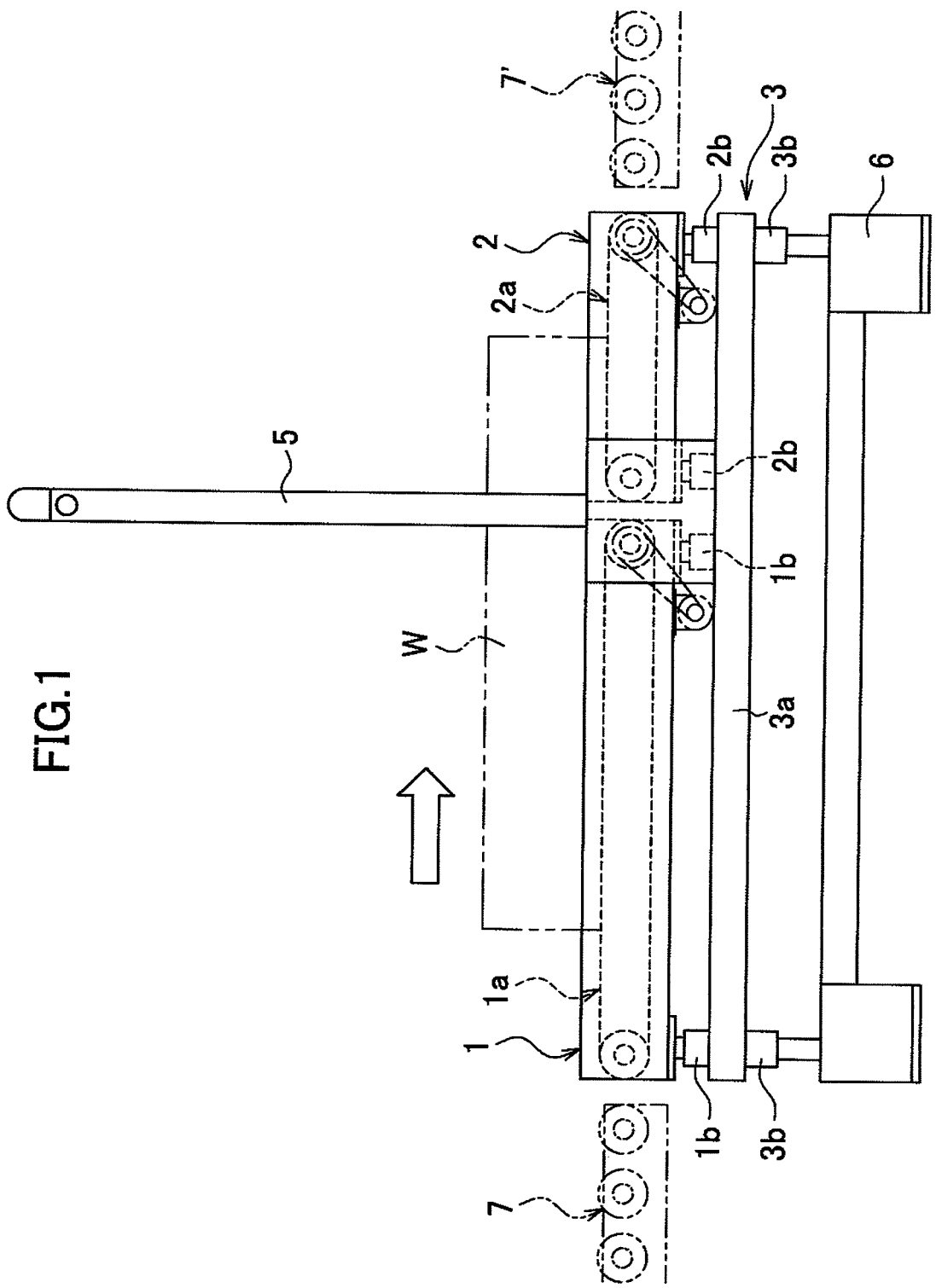
FIG. 1 is a front view of an apparatus for measuring an article in accordance with one embodiment of the invention.
Figure 2:
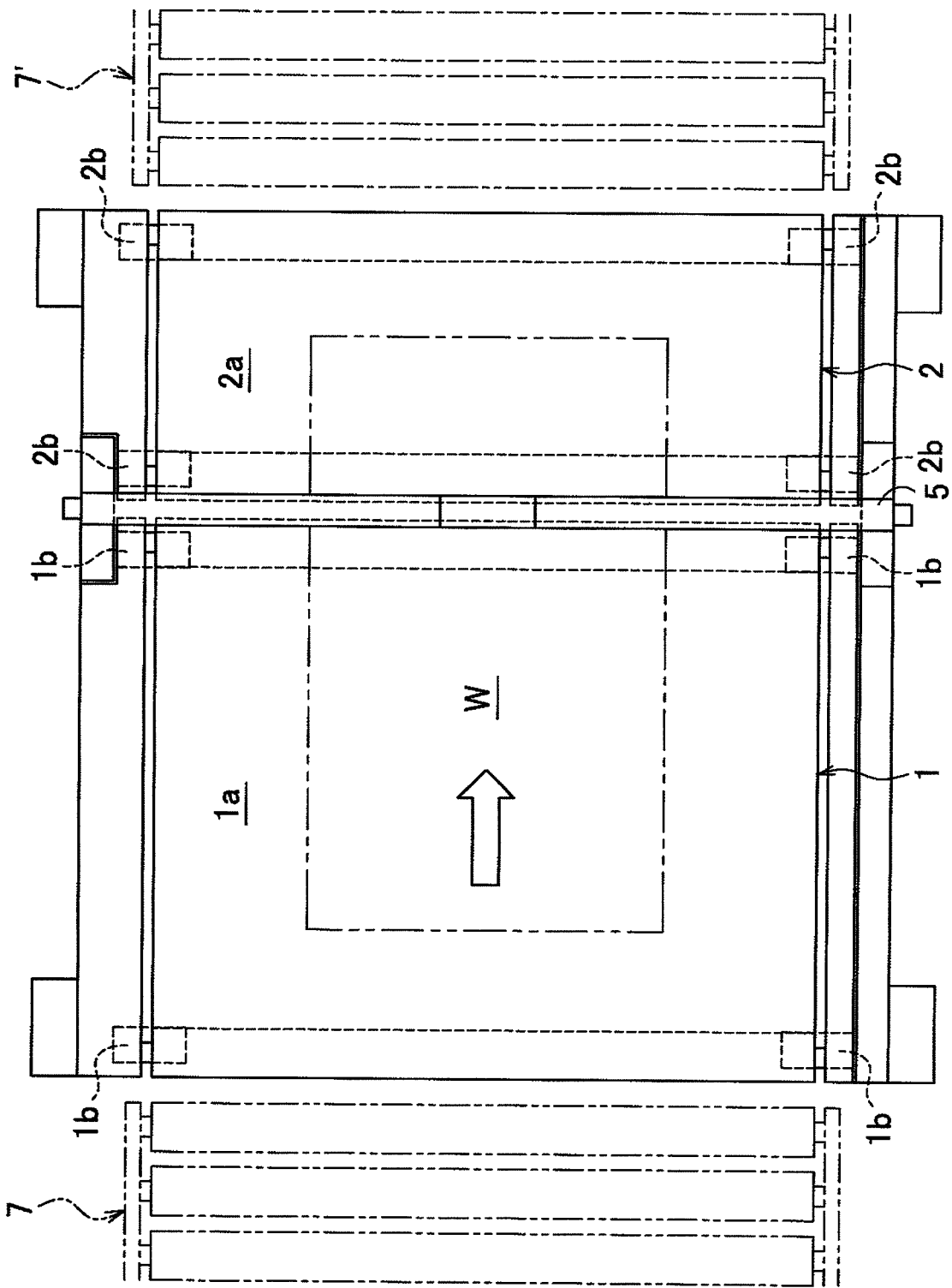
FIG. 2 is a plan view of the same.
Figure 3:
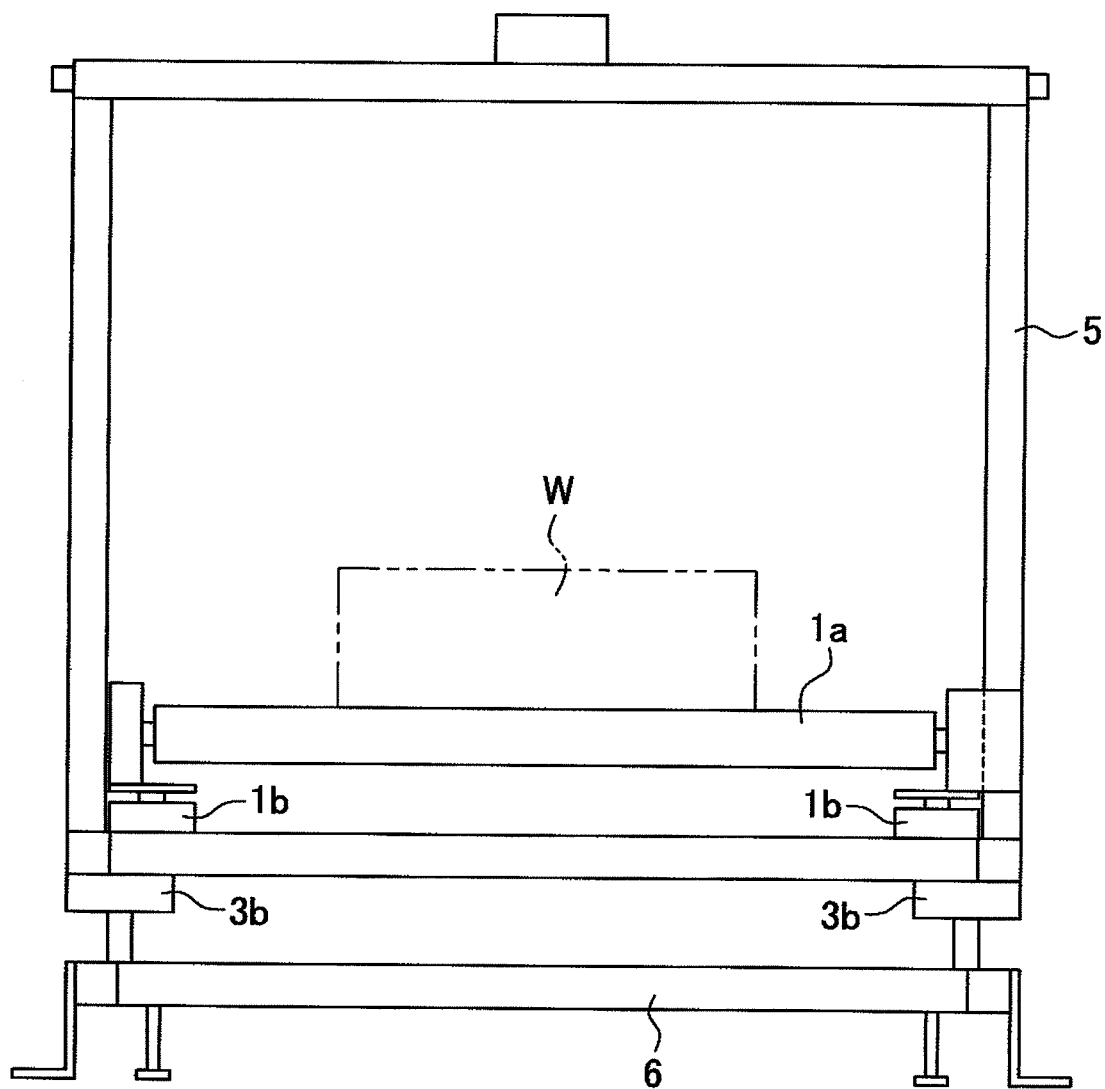
FIG. 3 is a side view of the same.

First, an apparatus for measuring articles with two conveying-weighing units and one weighing unit will be shown.
FIGS. 1 to 3 are schematic views of the embodiments of the apparatus for measuring articles which includes a first conveying-weighing unit 1 having a conveyer 1a for conveying an article W and a weighing device 1b for weighing the article W, a second conveying-weighing unit 2 having a conveyer 2a for conveying the article W and weighing device 2b for weighing the article W and a third weighing unit 3 for supporting and weighing the first conveying-weighing unit 1 and the second conveying-weighing unit 2, the weighing unit 3 having only weighing device 3b.

The first and second conveying-weighing units 1 and 2 have its conveyers 1a and 1b different from one another in its machine length (1a>2a). These two units are arranged adjacently in series to convey articles successively in a straight conveying direction. The first conveying-weighing unit 1 longer than the second conveying-weighing unit 2 in the machine length is placed before the second conveying-weighing unit 2 along the conveying direction. In addition, conveyers 7, 7' are adjacently located upstream of the first conveying-weighing unit 1 and downstream of the second conveying-weighing unit 2, respectively.

The third weighing unit 3 is provided with a frame 3a with a sufficient intensity that cannot be deformed by the first conveying-weighing unit 1 and the second conveying-weighing unit 2 supported thereon. The weighing devices 3b are located substantially under the four corners of the frame 3a. The third weighing unit 3 is a base-side weighing unit having its weighing devices 3b located on the horizontal surface of a base to measure a total weight of all articles W located and conveyed on the first conveying-weighing unit 1 and the second conveying-weighing unit 2.

The conveyers 1a and 2a of the first and second conveying-weighing units 1 and 2 are belt conveyers. The respective weighing devices 1b and 2b of the first and second conveying-weighing units 1 and 2 are located under four corners of respective frames of the conveyers 1a and 2a and on the upper surface of the frame of the third weighing unit 3. Thus, the weight of an article conveyed on the conveyer 1a of the first conveying-weighing unit 1 is measured by the weighing device 1b, while the weight of an article conveyed on the conveyer 2a of the second conveying-weighing unit 2 is measured by the weighing device 2b.

The weighing devices 1b, 2b and 3b for the conveying-weighing unit 1, conveying-weighing unit 2 and the weighing unit 3 can be load cells (strain gauges attached to strain-yielding bodies), which have been commonly used for weighing in recent years. The load cells are installed with improved rust-resistance, water-resistance, chemical-resistance, impact-resistance, vibration-resistance and environment-resistance, with circuitry, etc. designed to reduce a temperature drift.

An article length measuring sensor 4 (sensor unit) for measuring the length of articles in a conveying direction is provided between the end portion of the first conveying-weighing unit 1 and the first portion of the second conveying-weighing unit 2 over the third weighing unit 3. Specifically, detection sensors constituting the length measuring sensor 4 in a portal frame 5 located between the end portion of the first conveying-weighing unit 1 and the first portion of the second conveying-weighing unit 2 as shown in FIG. 4.

A plurality of light-emitting elements 4a are arranged on one vertical side member of the portal frame 5, while light-receiving elements 4b are arranged on the other vertical side member of the portal frame 5 opposite to the one vertical side member. The light-emitting elements 4a and the light-receiving elements 4b are arranged vertically from near the surface of the conveyers (belt conveyers) of the first and the second conveying-weighing units 1 and 2 respectively. The plurality of the light-emitting and the light-receiving elements 4a and 4b are located at regular intervals along the vertical side members of the frame 5 to measure the height of the article W as well. Further, a plurality of light emitting elements 8 are arranged at regular intervals on a horizontal side member of the frame 5 opposite to the surface of the conveyers to measure the lateral sides of the article W. Pairs of the light-emitting elements 8 and the light-receiving elements 8' (not shown) opposite to the light-emitting elements 8 are arranged to detect a width in a direction orthogonal to conveying direction.

The ON/OFF operation of the detection sensors indicates the article W passing through the length measuring sensor 4 (sensor unit). The length of the article can be calculated in real time in accordance with the transit time (between ON and OFF operation) and feeding speeds of conveyers 1a and 2a of the first and the second conveying-weighing units 1 and 2. The feeding speeds of conveyers 1a and 2a are set to be same.

The measurement of the length and the weight of the article W by using an article measuring apparatus (weighing conveyers) is controlled by a control panel (console) including a microcomputer, etc. provided near the apparatus.

Figure 5:
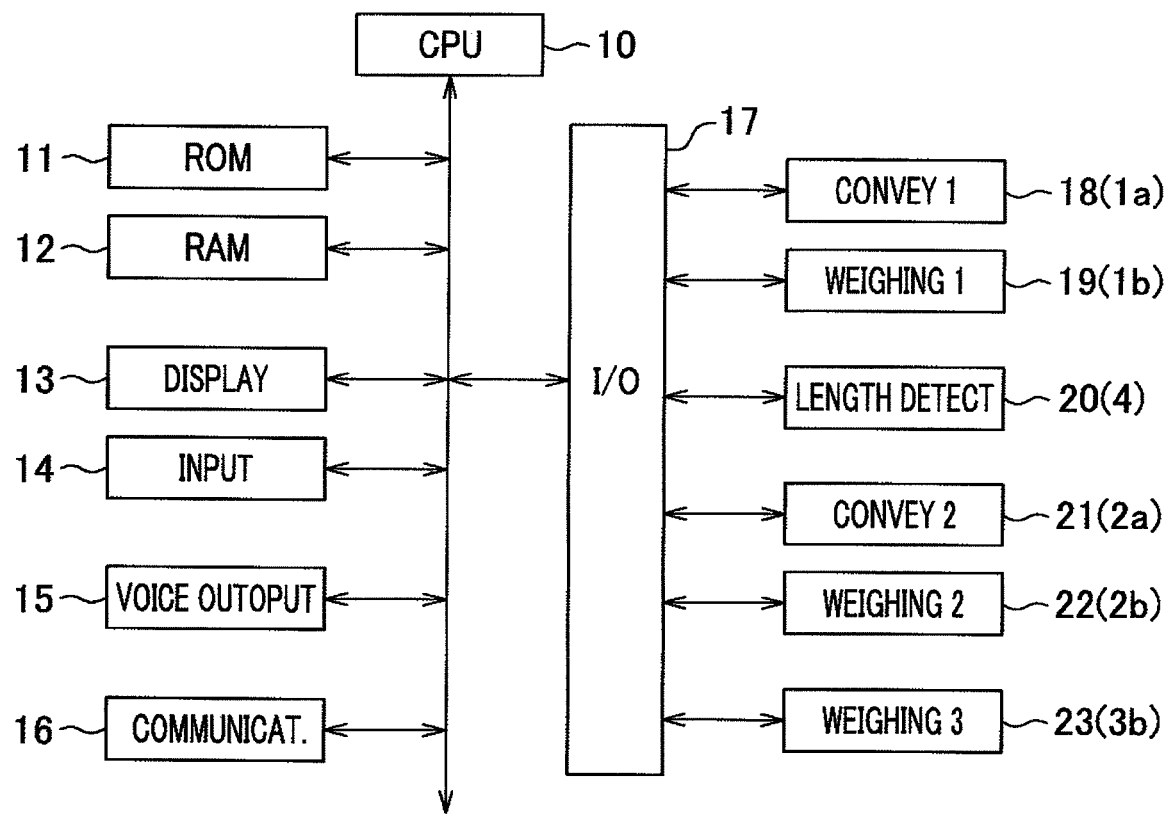
FIG. 5 is a block diagram of FIG. 1.

FIG. 5 is a block diagram showing a control of the apparatus for measuring an article, including CPU 10 for controlling the first conveying-weighing unit 1, the second conveying-weighing unit 2, and the third weighing unit 3, ROM 11 for storing a control program, RAM 12 for storing weight values measured by the weighing devices 1b, 2b and 3b of the first conveying-weighing unit 1, the second conveying-weighing unit 2 and the third weighing unit 3 respectively, lengths and output values measured or detected by the length measuring sensor 4 (detection sensors) and scale selection data defining the limits of article length respective weighing units can afford to measure, display 13 for displaying measured values, weights and data related to the article conveyed by conveyers, input operation part 14 for doing maintenance of weighing devices 1b, 2b and 3b or initializing preset data such as scale selection data, etc., announcing part 15 (voice output part) for announcing error and emergency, communication part 16 for communicating with higher-level devices (management system), I/O interface 17 for connected devices, conveying means 18 (conveyer 1a) of the first conveying-weighing unit 1, weighing means 19 (weighing device 1b) of the first conveying-weighing unit 1, length measuring detection part 20 (length measuring sensor 4) (gate sensor), conveying means 21 (conveyer 2a) of the second conveying-weighing unit 2, weighing means 22 (weighing device 2b) of the second conveying-weighing unit 2 and weighing means 23 (weighing device 3b) of the third weighing unit 3. The weighing means 19, 22 and 23 include A/D converters respectively. In addition, the announcing part 15 may be equipped with a red flasher or the like other than a voice output part. The red flasher can be mounted on the frame 5 having the length measuring sensor 4 installed thereon.

FIG. 6 shows article data stored in RAM 12 of the console shown in FIG. 5 as the upper management device of the conveying-weighing unit 1, the data including items of article codes for identifying articles, JAN codes, article titles, units, storage rack numbers.

FIG. 7 shows shipment data stored by the upper management device, the data including items for identifying ship-to information such as shipment numbers, ship-to name, shipping route, consolidating stations, ship-to Jip codes, ship-to address, ship-to telephone numbers, etc.

FIG. 8 shows shipping operation data stored by the upper management device, the data including shipping IDs, shipping ID detailed numbers, shipment numbers, ship-to name, delivery dates, article codes, JAN codes, article names, numbers of shipment, numbers of results, completion flags, etc. The shipping IDs and shipping ID detailed numbers are transmitted to weighing conveyers and stored in a work area of the RAM 12.

FIG. 9 shows scale selection data stored in the RAM 12, including items of scale numbers, length limit 1 (lower limit), length limit 2 (upper limit), judgment by the length limits 1 and 2 such as "under", "within" or "over". The scale numbers 1, 2, and 3 stand for the second conveying-weighing unit, the first conveying-weighing unit and the third weighing unit respectively.

FIG. 10 shows weights measured by respective weighing devices and stored in a work area of RAM 12. The data represents measured weights when successively conveying-weighing articles with 50 Kg in weight and 1051 mm or more in length. In this case, the values shown in detailed number 3 at Time 2, 4 and 6 are adopted as weights of articles 1, 2 and 3.

Hereinafter, the operation of measuring weights and length using the apparatus for measuring an article will be described with reference to a flowchart shown in FIG. 12.

S101: A program judges whether or not to terminate. A judgment is made as to whether "termination" is displayed in a display or "termination button" of an input operation part is pressed. If pressed (Yes), the program goes to an end, otherwise (No) it goes to step S102.

S102: The start of operation is judged. Specifically, a judgment is made as to whether "start" is displayed in a display or "start button" of the input operation part is pressed. If pressed (Yes), program goes to S103, otherwise (No), it goes back to step S101.

S103: The conveyers 1a of the first conveying-weighing unit 1 and the conveyers 2a of the second conveying-weighing unit 2 start to move.

S104: The presence of an error state is judged. Specifically, incapabilities or errors are judged for each weighing device of the first conveying-weighing unit 1, the second conveying-weighing unit 2 and the third weighing unit 3, each conveyer of the first and second conveying-weighing units 1 and 2 and article length measuring sensor 4 (detection sensors). If any error is detected (Yes), the error is explained in a display and the program goes to step S105. If error is not detected (No), the program goes to step S106.

S 105: It is judged whether "removal" is shown in a display or a "removal button" in the input operation unit is pressed. If the "removal button" is pressed, the program goes back to step S103. In case of errors due to some physical causes, the "removal button" preferably is not be pressed unless countermeasures are taken by an operator.

S106: An upper management device judges whether a shipping ID are received. If it is received (Yes), the program goes to S 107 and if not (No), goes to S 108.

If the upper management device does not receive a shipping ID, it means the shipping operation data (see FIG. 8) has been processed or does not exist. In that case, it receives no shipping data, producing automatic generation of unique virtual shipping ID in serial number, storing it in a work area of RAM 12 and the program goes to S 108 after setting the ID as a shipping ID of a present article. The shipping ID is used to connect a conveyed article to the weight measured and authorized. The upper management device produces a series of unique IDs for each shipping instruction data. The IDs can be produced to increment numbers from a starting point. In case the upper management device does not produce an ID, CPU 10 in a control panel provided at a conveying-weighing unit produces the shipping ID in a work area of RAM 12 for each conveyed and weighed article.

S107: A program requests for the shipping operation data with the upper management device, storing the received shipping ID in a work area of RAM 12 and the program goes to S 108.

S 108: The length measuring sensor 4 (gate sensor) detects "IN" and "OUT" of an article fed by conveyors to judge whether the article is fed. If a single photo sensor measures a length of an article, it detects "ON" and "OFF" of the article at regular intervals. The time interval of detections is varied in accordance with a feeding speed of a conveyer. The feeding speed of a conveyer is preset in a maintenance mode and stored in a condition setting area of RAM 12.

If the sensor is ON (No), a program judges that the article W is not fed, while if the sensor is OFF (YES), the program judges that the article W is fed, then goes to S 109. A single photo sensor can be used, however two or more photo sensors can be used as well to detect "ON" and "OFF" at regular intervals and measure the length of the article W. In addition, the detection described above uses bright=ON (not shaded by article) and dark=OFF (shaded by article) to judge signals, however judgment of signals can be appropriately altered according to conditions.

S 109: A program can calculate the length of the article W using measuring "ON" and "OFF" and a feeding speed of conveyers. Alternatively the number of a scale to be selected can be determined by a combination or an order of output signals outputted from article detection sensors located at both ends of the respective conveying-weighing units or by simply judging whether the article being conveyed protrudes beyond both ends of the conveying-weighing units other than by calculating the length of the article as described above.

S 110: The weights of the article W measured by weighing devices 1b, 2b and 3b (weighing means 19, 22 and 23) are stored in a work memory.

S111: The measured value is determined by selecting a measured value from RAM 12 storing successively the values measured by the weighing device 3b for measuring large load, the weighing device 1b for measuring medium load and the weighing device 2b for measuring small load in accordance with the length measured by the article length measuring sensor 4 (sensor unit).

If the length of the article W is 440 mm or less which is calculated in accordance with the detection time of the article measured by the sensor unit 4 and the feeding speed of conveyers, then the value measured by the weighing device 2b (scale number: 1) of the second conveying-weighing unit 2 for measuring small lord is read from RAM 12 in accordance with the scale selection data (see FIG. 9) stored in RAM 12 the program goes to S 112. If the length of the article W is 441 mm or more and 1050 mm or less, then the value measured by the weighing device 1b (scale number: 2) of the first conveying-weighing unit 1 for measuring medium lord is read from RAM 12 in accordance with the scale selection data (see FIG. 9) stored in RAM 12 in a similar fashion and the program goes to S 113.

If the length of the article W is 1051 mm or more, then the value measured by the weighing device 3b (scale number: 3) of the third weighing unit 3 for measuring large lord is read from RAM 12 in accordance with the scale selection data (see FIG. 9) stored in RAM 12 in a similar fashion and the program goes to S 114. If S 109 determines the scale number, the program goes according to the determined scale number.

Figure 11A:
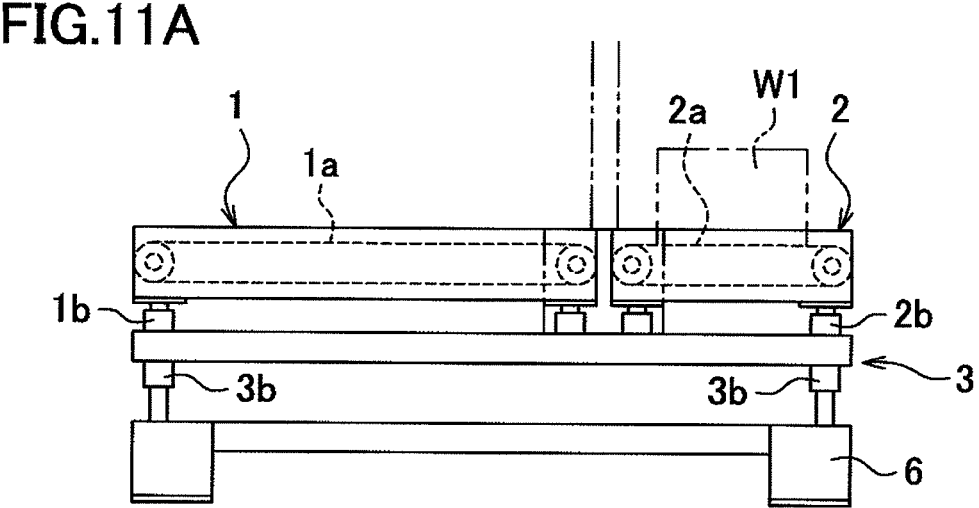
FIG. 11 shows measuring weights according to the length of an article, wherein (a) shows measuring a weight by a second conveying-weighing unit, (b) shows measuring a weight by a first conveying-weighing unit and (c) shows measuring a weight by a third weighing unit.
Figure 11B:
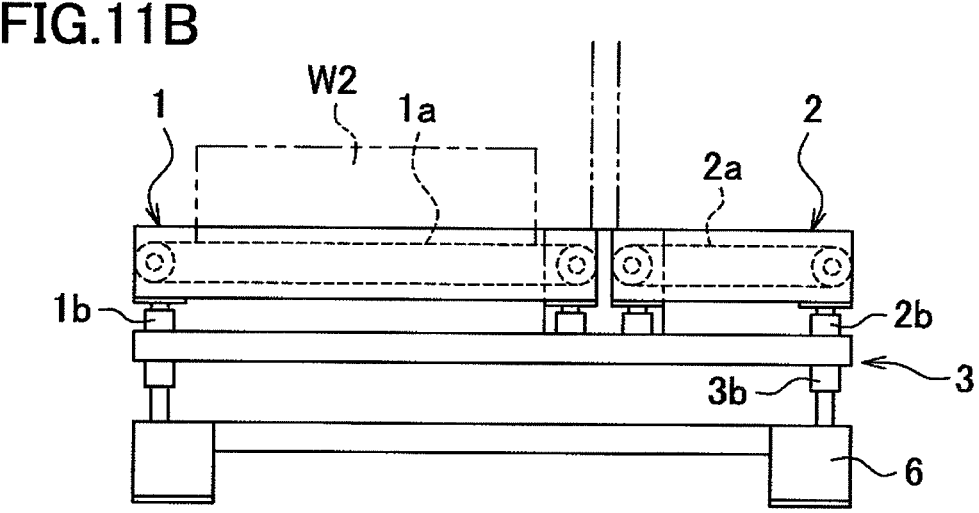
Figure 11C:
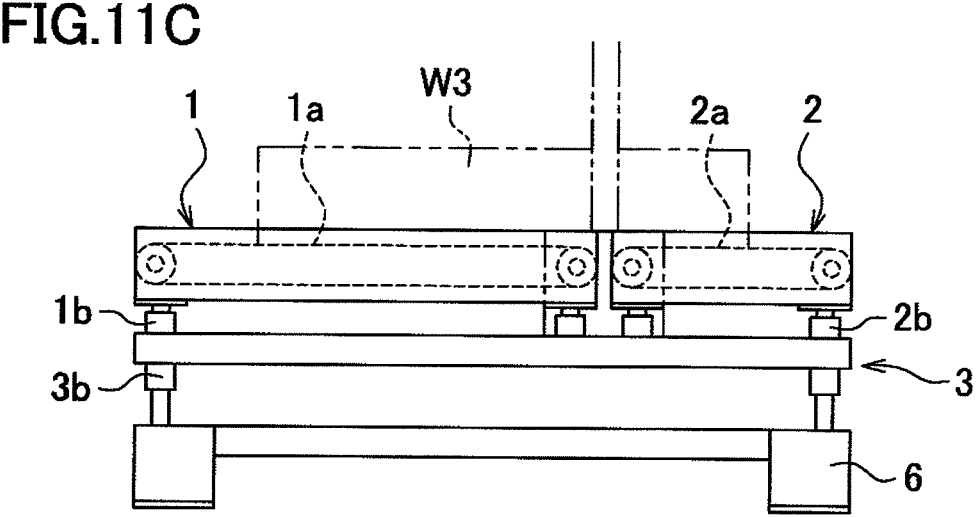

S 112: As an article W1 that is within the machine length of the second conveying-weighing unit 2 is conveyed, the weight is calculated in accordance with the value measured by the weighing device 2b (scale number 1) and the program goes to S 115 (see FIG. 11 (*a*)).

The respective weights of articles successively conveyed by conveyers are determined using the conventional method of moving average for respective measured values that can be separated by cyclic variation with each article, in accordance with the time of passing through the length measuring sensor 4 (from ON to OFF), the feeding speeds of conveyers 1a and 2a and the values measured by the weighing device 2b (scale number: 1) successively stored in the RAM 12.

In case error occurs when measuring weights and length, or any measured weight shows abnormal value, the program stores the error together with the cause in a work area of the RAM12.

S 113: As an article W2 that is longer than the machine length of the second conveying-weighing unit 2 but within the machine length of the first conveying-weighing unit 1, the weight is calculated based on the measured value of the weighing device 1b (scale number: 2) and the program goes to S 115 (see FIG. 11 (*b*)).

In the same fashion as described above, the respective weights of articles successively conveyed by conveyers are determined using the conventional method of moving average for respective measured values that can be separated by cyclic variation with each article, in accordance with the time of passing through the length measuring sensor 4 (from ON to OFF), the feeding speeds of conveyers 1a and 2a and the values measured by the weighing device 1b (scale number: 2) successively stored in the RAM 12.

In case error occurs when measuring weights and length, or any measured weight shows abnormal value, the program stores the error together with the cause in a work area of the RAM12.

S 114: As an article W3 that is longer than the machine length of the first conveying-weighing unit 1, the weight is calculated based on the measured value of the weighing device 3b (scale number: 3) and the program goes to S 115 (see FIG. 11 (*c*)).

In the same fashion as described above, the respective weights of articles successively conveyed by conveyers are determined using the conventional method of moving average for respective measured values that can be separated by cyclic variation with each article, in accordance with the time of passing through the length measuring sensor 4 (from ON to OFF), the feeding speeds of conveyers 1a and 2a and the values measured by the weighing device 3b (scale number: 3) successively stored in the RAM 12.

In case any errors occurs when measuring weights and length, or any measured weight shows abnormal value, the program stores the error together with the cause in a work area of the RAM12.

S 115: A judgment is made as to whether or not any errors occur during the time of measuring lengths and weights, conveying articles, determining weights or as to whether any errors exist in various types of sensors based on the stored error data in the work area of the RAM 12. If it is judged that an error exists (YES), then the program goes to step S116; if it is judged that no error exists (NO), then the program goes to step S118.

S 116: Descriptions of errors are shown in a display 13. Otherwise, a red flasher is flashed or blinked.

S 117: The movements of the conveyers 1a and 2a of the first and the second conveying-weighing units 1 and 2 are stopped, and then the program goes back to step S 104.

S 118: The calculated weight of the article is displayed in the screen of the console. Data is displayed as needed in a 2-D table, including a feeding order, item designations like "length" and "weight", etc. and corresponding values concerning the article.

A changing weight is continually displayed as the article is fed on a conveyer. When a weight is calculated and determined, the determined weight is fixed in the display. The display is, for instance a liquid crystal display provided at a control panel (console).

S 119: The result is stored in a result storing area of the RAM 12 and sent to an upper management device. If results are constantly sent to the upper management device, they may not be required to be stored in the result storing area of RAM 12.

S 120: Judgment is made as to whether the operation is completed or suspended. If the operation is completed or suspended (YES), the program goes back to step S101, if not, it goes back to step S104.

The judgment as to whether the shipping operation of an article should be terminated is made depending on whether "completion/suspension" is displayed in the display 13, whether "completion/suspension" button provided at the input operation part is pressed, or whether "completion/suspension" data is received from the upper management device. If the "completion/suspension" button is pressed, or the "completion/suspension" data is received from the upper management device, the program goes back to step S 101, otherwise it goes back to step S 104.

The apparatus for conveying articles as illustrated and described above has the first conveying-weighing unit 1 for measuring a medium load and the second conveying-weighing unit 2 for measuring a small load arrange adjacently in series, each unit including a conveyer and a weighing device. The apparatus has the first and the second conveying-weighing units 1 and 2 located over and supported by the third weighing unit 3 for measuring a large load with no conveyer. The measured weights by the first, second and third units are successively stored in RAM 12.

Further, a sensor unit for measuring the length of an article is provided between the first conveying-weighing unit 1 and the second conveying-weighing unit 2, wherein the sensor unit detects articles passing through the sensor location. The length of an article conveyed can be calculated in real time by the passing through time (from ON to OFF) and the feeding speed of the conveyer. The weight of the conveyed article is determined by selecting a value from the RAM 12 storing successively values measured by the weighing devices 1b, 2b, and 3b provided at the first, the second and the third unit for measuring medium, small and large loads respectively in accordance with the length of the article measured by the sensor unit.

Next, selection and determination of the weight is described. If the calculated length of the article is equal or less than the machine length of the second conveying-weighing unit 440 mm, then the value stored in RAM 12 that is measured by the weighing device 2b of the second conveying-weighing unit 2 for measuring small lord will be adopted. If the calculated length of the article is 441 mm or more (more than the machine length of the second conveying-weighing unit 2) and 1050 mm or less (within the machine length of the first conveying-weighing unit 1), then the value stored in RAM 12 that is measured by the weighing device 1b of the first conveying-weighing unit 1 for measuring medium lord will be adopted. Further, if the calculated length of the article is 1051 mm or more (more than the machine length of the first conveying-weighing unit 1), then the value stored in RAM 12 that is measured by the weighing device 3b of the third weighing unit 3 for measuring large lord will be adopted. Further, the weights are determined based on the measured values read from the RAM 12 using the conventional method of moving average, displayed successively in the display and sent to the upper management device through a connection interface to external devices.

The respective weights of articles successively conveyed by conveyers can be calculated and determined for respective measured values that can be separated by cyclic variation with each article, in accordance with the time of passing through sensor unit 4 (from ON to OFF) for measuring the length of the article, the feeding speeds of conveyers and the measured values successively stored in the RAM 12.

According to above method, the weights of articles can be determined by using a single weighing device (weighing unit) selected in accordance with the actual length of the article conveyed. And, it is easily distinguished whether an article is being conveyed on a single conveying-weighing unit or being conveyed over two conveying-weighing units even if the article is conveyed slantwise.

Thus, the weights of articles can be determined based on values measured by respective independent weighing devices, thereby displaying or outputting correct weights of conveyed articles.

The two or more conveying-weighing units with different machine lengths are arranged in the order of the longer machine length along the conveying direction. However, the arrangement order of conveying-weighing units is not limited. They can be arranged at random.

The conveyers of the conveying-weighing units can be belt conveyers or roller conveyers.

Embodiments can use not only load cells having strain gauges attached to strain-yielding bodies, but can use load meters of a servo system using electromagnetic balance type, metal tuning fork vibration type, string vibration type, capacitance type, piezoelectric type, magnetostrictive type, gyro type or hydraulic type.

The length measuring sensor 4 (sensor unit) can be placed out of the whole length of the conveying-weighing units arranged in series. For example, it can be placed in the inlet conveyer side located upstream of the article measuring apparatus. In the case that the sensor unit 4 is placed out of the whole length of the conveying-weighing units, the feeding speeds of the respective conveyers of the conveying-weighing units arranged in series must be same, because the length of an article is measured based on the detection time of the article by the sensor unit 4 and the feeding speeds of conveyers feeding the article.

Further the length measuring sensor 4 is not limited to above described sensor. It can use a device including a pulse generator generating pulses synchronized with the feeding of the conveyers, a displacement sensor detecting contactless the distance to the article that are being conveyed by the conveyers and outputting the distance signals, and a signal processing circuit that outputs a judging signal of the leading and tail ends of the article based on a big change in successive sampling values during sampling of the distance signals, counts the pulse signals based on the judging signal of the article ends and measures the length of the article in the feeding direction.

Selection of the values respectively outputted from the each conveying-weighing unit and the base-side weighing unit according to the length of the article measured by the article length measuring sensor can be performed, for instance, by storing in a memory a scale selection data defining the limit of the length of the article to be measured by the respective weighing devices of the conveying-weighing units and the base-side weighing unit and the selection part selecting one of the values according to the length measured by the article length measuring sensor and the scale selection data stored in the memory. The selection of the values also can be performed by incorporating the scale selection data in a computer program. Alternatively, it can be performed by using a combination or an order of the output signals outputted from article detection sensors provided at both ends of the conveying-weighing units or simply by judging whether the article is over the length of the conveyers.

The selecting part (determining part) is installed in a microcomputer constituting a control panel (console) provided near the article measuring apparatus.

Embodiment 2

Figure 13:
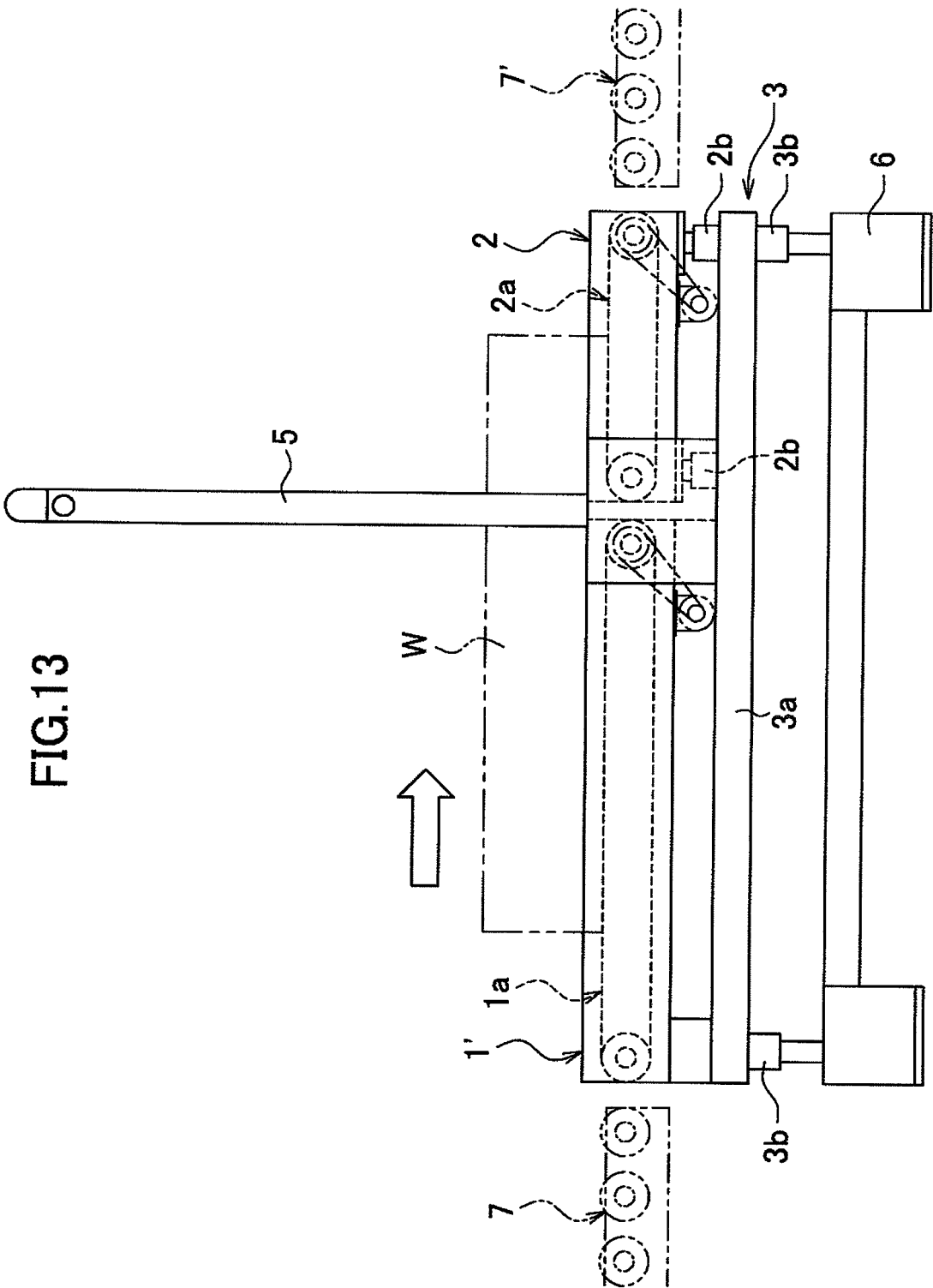
FIG. 13 is a front view of an apparatus for measuring an article in accordance with another embodiment of the invention.

FIG. 13 shows an apparatus for conveying articles having a first conveying unit 1' only with a conveyer 1a and a second conveying-weighing unit 2 with a conveyer 2a and a weighing device 2b arranged over a third weighing unit 3 only with a weighing device 3b, the first and the second units 1' and 2 being adjacently in series. As shown in the first embodiment, the apparatus has a sensor unit 4 located between the conveying unit 1' and the conveying-weighing unit 2 for measuring the lengths of articles successively conveyed by the conveyers 1a and 2a of the first and the second units 1' and 2. In other words, the apparatus of the second embodiment is different from that of the first embodiment only in that the first conveying unit 1' includes no weighing devices.

Further, as same as the first embodiment, the machine length of the first conveying unit 1' is set to be longer than the machine length of the second conveying-weighing unit 2. The same symbols are used for the same members shown in the first embodiment to curtail descriptions.

When an article W is conveyed and weighed by the apparatus described above, if the length of the article W conveyed is within the machine length of the second conveying-weighing unit 2, then the weight measured by the weighing device 2b of the second conveying-weighing unit 2 is adopted. If the length of the article W is longer than the machine length of the second conveying-weighing unit 2 and within the machine length of the first conveying unit 1' or longer than the machine length of the first conveying unit 1', then the weight measured by the weighing device 3b of the third weighing unit 3 is adopted.

Figure 12:
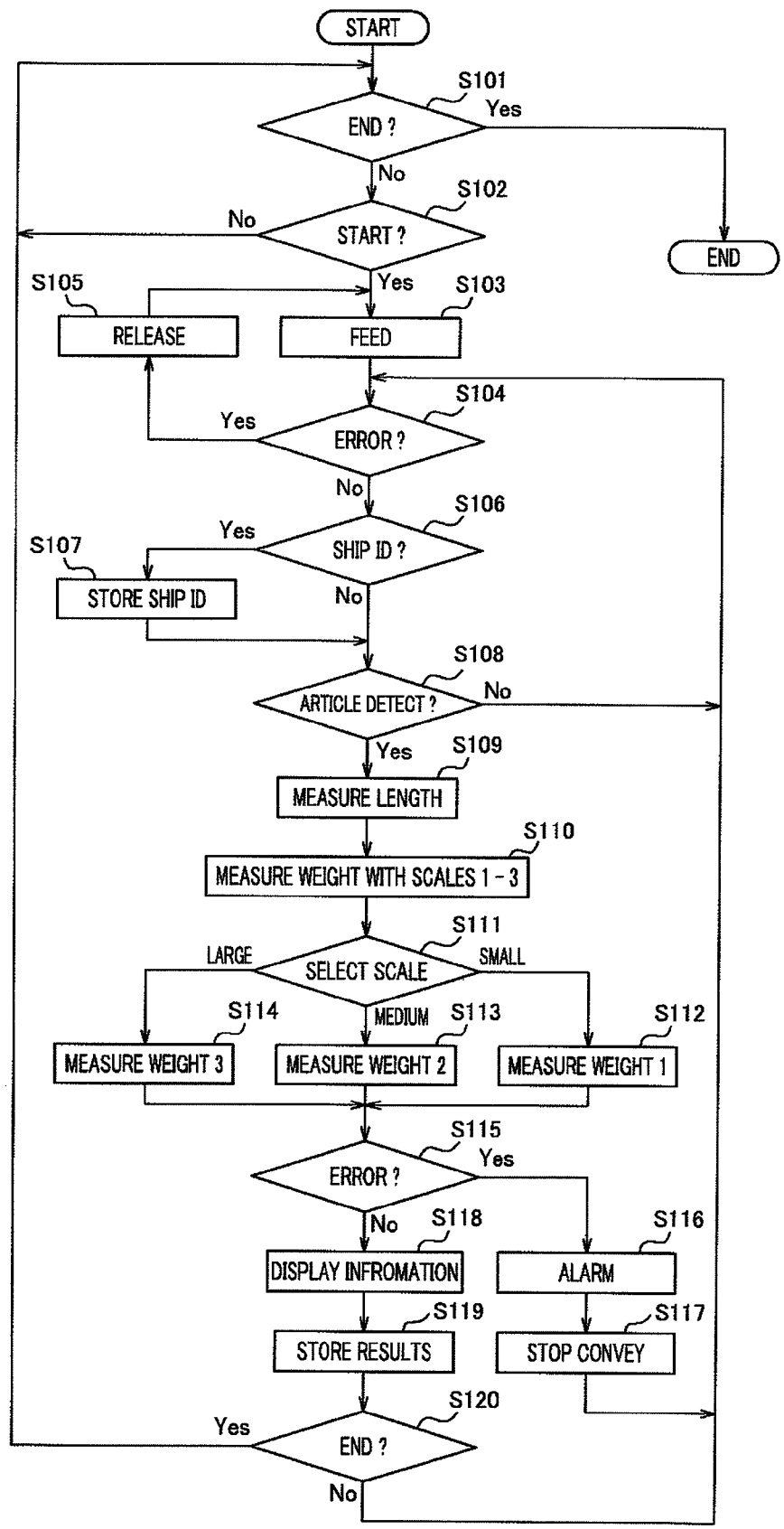
FIG. 12 is a flowchart showing weighing operation by the apparatus for measuring an article of FIG. 1.

Thus, with reference to the flowchart of FIG. 12 showing the measuring operation of the first embodiment, if the length of the article W is judged "medium" or "large", the program goes to step S 114 and the weight is calculated based on the measured valued of the weighing device 3b.

Further, the weight of the article on the first conveying unit 1' can be calculated by subtracting the weight data of the second conveying-weighing unit 2 from that of the third weighing unit 3 on the condition that the articles within the respective machine lengths of the first conveying unit 1' and the second conveying-weighing unit 2 are successively conveyed on the conveyers 1a and 2a, without going over the first unit 1' and the second unit 2.

Correct weights can be measured because even if an article is conveyed over the first conveying unit 1' and the second conveying-weighing unit 2 as described above, which does not affect the stress on the third weighing unit 3. In addition, the number of the weighing devices (load cell) can be reduced, thereby cutting down the cost of the apparatus.

Thus, an apparatus for measuring articles capable of improving time efficiency for measurement and weighing efficiency with reduced weighing devices can be presented.

Next, an apparatus for measuring articles is described with reference to a drawing.

Figure 14:
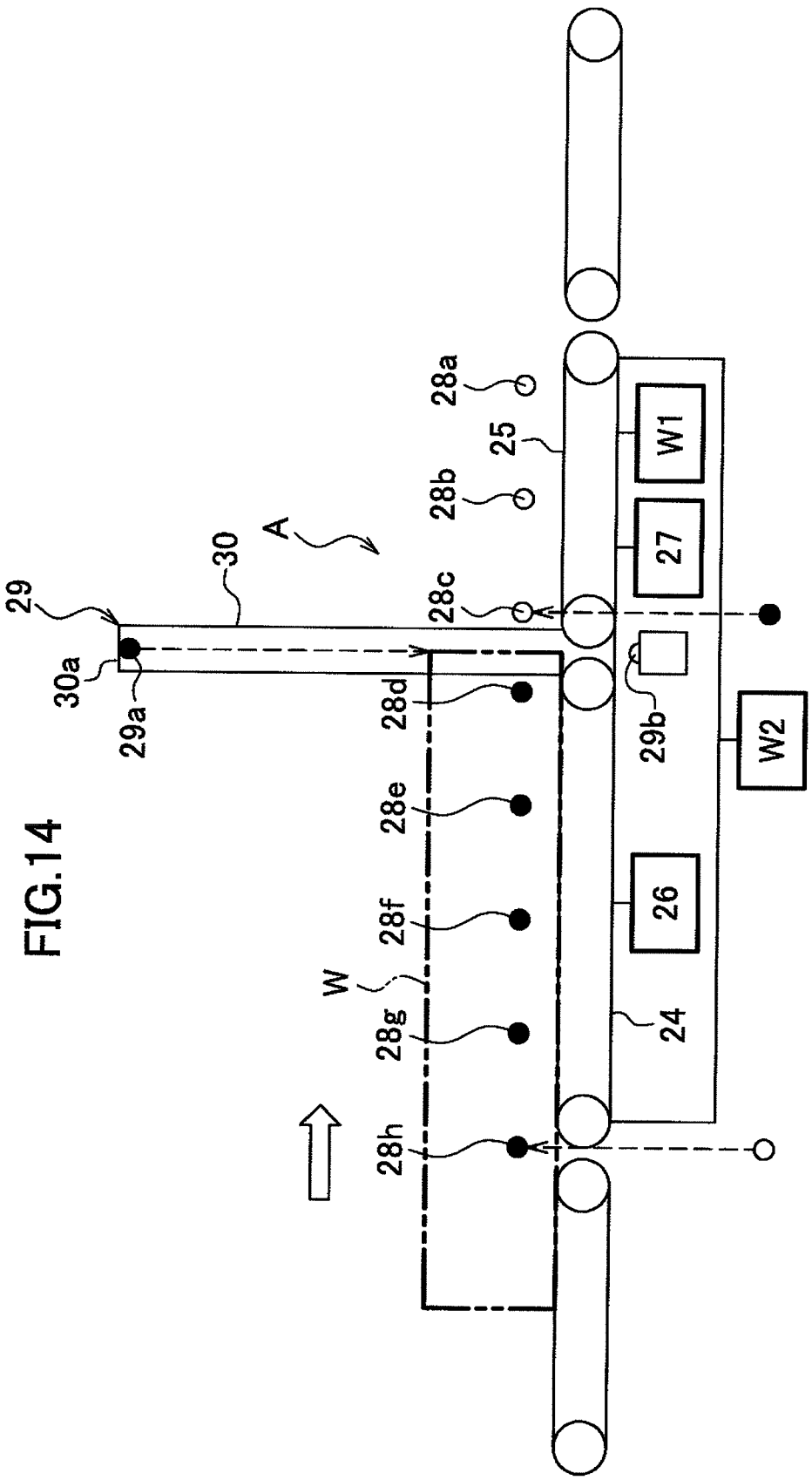
FIG. 14 is a view showing a frame format of measuring dimensions of an article by the apparatus for measuring an article.

FIG. 14 is a view showing a frame format of measuring dimensions of an article by the apparatus for measuring an article. The conveying unit A has a belt conveyers 24 and 25 arranged adjacently in series in a straight line, and pulse encoders 26 and 27 are provided at the respective conveyers 24 and 25 to generate pulse signals synchronized with the respective movements of the conveyers 24 and 25. In addition, article detection sensors 28a to 28h for detecting articles are arranged at regular intervals along the belt conveyers 24 and 25 constituting the conveying unit A. The detection sensors 28a to 28h detect an article W being conveyed on the conveyers 24 and 25.

Further, a side detection sensor 29 is located between the belt conveyers 24 and 25, the side detection sensor 29 including a sensor 29' for detecting contactless the article W and outputting the detection signals of the lateral sides orthogonal to the moving direction and the leading and tail ends of the article W being conveyed, and a signal processing circuit for judging the leading and tail ends of the article W based on successive sampling values of the detection signals, counting the number of pulses based on judging of the leading and tail ends of the article W, measuring the locations of the lateral sides of the article W orthogonal to the moving direction of the article W with reference to the leading and tail ends.

The sensor 29' of the side detection sensor 29 has photo sensors with pairs of light-emitting element 29a and light-receiving element 29b arranged above and below the conveying path respectively to detect the moving article at regular intervals. The side detection sensor 29 is formed to have a portal frame 30 over the conveying path (conveying unit A). The horizontal part 30a of the portal frame 30 has a plurality of the light-emitting elements 29a located at regular intervals along the longitudinal direction, while a plurality of the light-receiving elements 29b are located below the conveying path opposite to the plurality of the light-emitting elements, whereby a so-called gate sensor is constituted.

A control unit (CPU) controls the conveying unit including belt conveyers 24 and 25, the pulse encoders 26 and 27, the article detection sensors 28a to 28h and the side detection sensor 29 (sensor unit 4). The control unit includes, a signal processing part for judging the leading and tail ends based on the sharp changes of sampling values, measuring the locations of the lateral sides of the article W orthogonal to the moving direction of the article W with reference to the leading and tail ends, a counting part for counting the pulse signals at every sampling time and dimension calculation part for storing successively the locations of the lateral sides of the article orthogonal to the moving direction measured by the signal processing part along the moving direction of the article based on the count number by the counting part, then correcting the stored data in accordance with the distance between the article detection sensors to produce correct locations (locations X) and storing again the corrected data every time the article detection sensors detect the article W and calculating dimensions of an article based on corrected data.

Hereinafter described is the concept and flow of measuring the length (longitudinal dimension) and width (transversal dimension) of the article W with the above described dimension-measuring apparatus.

1. Measuring of an article is started when the leading end of the article W is detected by detection sensor 29' of the side detection sensor 29.

2. Outputs of the pulse encoders 26 or 27 are counted. The start and end of counting by the pulse encoders are repeated each time that the sensor 29 detects both sides of the carried article W at regular time intervals (e.g. 3 msec).

3. The side detection sensor 29 detects both sides of the carried article W. The side locations Y1 and Y2 of the article W define the distances from a side f (reference surface) to the lateral sides. The detected lateral side locations Y1 and Y2 of the article W and corresponding feeding distances (distance X1 for Y1, distance X2 for Y2) are stored in the detection table (see FIG. 25) of the RAM along with the counted numbers of the pulse encoders 26 and 27

Figure 15:
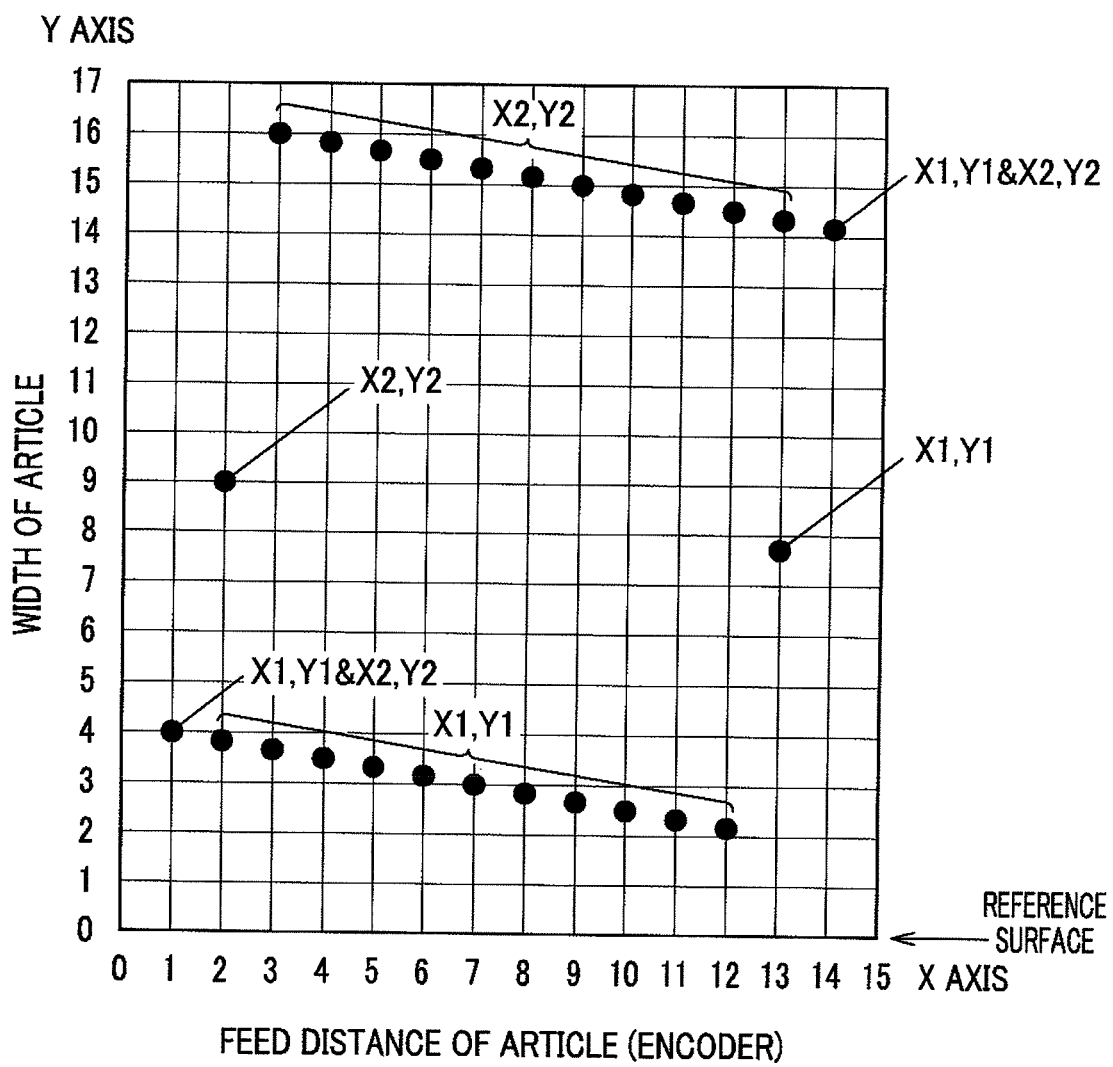
FIG. 15 is an image view of measured values plotted and stored in a work area of a RAM.

Above-described steps 2 and 3 are repeated at regular time intervals (e.g. 3 msec) to obtain data as shown in FIGS. 15 and 25 and Table 1. The feeding distance (X1, X2) stored at this point is the distance (X) corresponding to regular time intervals (e.g. 3 msec) between detections by the side detection sensor 29. The distance (X) is the distance the article W is fed after the side detection sensor 29 detects the leading end of the article W and a provisional distance the article W proceeds for a regular time interval (e.g. 3 msec) is preliminarily stored in the RAM 46.

4. The article detection sensors 28a to 28h detect a movement of the article W on the conveyers 31a and 32a. Whether the article W passes through the article detection sensors 28a to 28h after passing through the side detection sensor 29 is judged. If yes, the program goes further.

5. The distances of movement in a feeding direction (coordinates X1, X2) stored in the detection table shown in FIG. 25 corresponding to both sides of the article W (coordinates Y1, Y2) are corrected to actual positions (distances) based on the movement of the article W between the article detection sensors, and stored again in the detection table.

Corrections are performed in the following manner:

After an article detection sensor detects the article W, the correction operation for the dimensions of the article W is started when the next article detection sensor detects the leading end of the article W.

For example, the article W shown in FIG. 14 is fed in the direction of the arrow and its leading end is detected by the side detection sensor 29. Then, when the article detection sensor 28c shown in the FIG. 14 detects the leading end of the article, a first correction operation is performed. Next, a correction operation is performed when the article detection sensor 28b detects the leading end of the article. Subsequent correction operations are performed when each article detection sensor detects the leading end of the article W.

In the case where the article W is long enough to cover the belt conveyer 24 and the belt conveyer 25, the correction operation is performed when each article detection sensor 28c, 28b and 28a arranged within the machine length of the belt conveyer 25 turns off (detection of the leading end of the article), while the correction operation is performed when the article detection sensors 28d to 28h arranged within the machine length of the belt conveyer 24 turns on (detection of the tail end of the article) on the condition that the article detection sensor 28a is off (detection of the article) and any one of the article detection sensors 28d to 28h is off (detection of the article). Further, the last correction operation for the article W is performed when the side detection sensor 29 detects the tail end of the article W.

Each of the feeding distances X (coordinates X1, X2) corresponding to both lateral sides Y (coordinates Y1, Y2) stored in the detection table shown in FIG. 25, during the time from a detection of the leading end of the article W by an article detection sensor to a detection of the same by the next sensor, is corrected and stored again in the detection table. More specifically, the count number of pulse encoders 26 or 27 stored in a memory at regular time intervals (e.g. 3 msec) is read out of the memory to calculate a correct feeding distance X in accordance with a ratio of each count number to a total count number counted between the sensors according to its distance and stored again as the correct feeding distance X (coordinates X1, X2) in the detection table shown in FIG. 25.

Being unable to describe all data stored at every 3 msec in limited pages without modification, the detection table in FIG. 25 shows data at every 30 msec instead of 3 msec just for illustrative purpose.

Table 1 illustrates the detection data before aggregation, the data at every 3 msec as shown in line numbers 2-0 to 2-9 (surrounded by a rectangle) corresponding to the line numbers 1 to 2 of the detection table of FIG. 25 corresponding to the distance between the side detection sensor 29 and the article detection sensor 28c, to describe the correction process of the aggregated data at every 30 msec as shown in the detection table of FIG. 25.

FIG. 15 is a visual image of detected data of the carried article W stored in the detection table of Table 1 or FIG. 25, wherein (X1, Y1) shows a trajectory of one end of the article (outline) and (X2, Y2) shows a trajectory of the other end of the article (outline).

With reference to Table 1 showing details between the line numbers 1 and 2 of the detection table in FIG. 25, the correction process is described hereinafter using both the lateral sides (Y1, Y2) of the article W and the corresponding encoder count numbers stored during the movement between the article sensors.

The line number 1 of the Table 1 stores detection data when the side detection sensor 29 detects the leading end of the article W, while the line number 2-9 stores detection data as the last data between the side detection sensor 29 and the article detection sensor 28c when the article detection sensor 28c detects the leading end of the article W.

Regarding the detection data from line number 1 to line number 2-9 of Table 1, the feeding distance X (coordinates X1, X2) of the detection table stored in the memory is corrected in accordance with a ratio of the encoder count number of each line to a total count number corresponding to the distance between sensors, and stored again in the memory.

For example, the group of line numbers 1 to 2-9 shown in the Table 1 stored in the memory corresponds to a distance between the side detection sensor 29 and the article detection sensor 28c. The distance between the side-detection sensor 29 and the article detection sensor 28c is defined as 1, thus X1, X2 of the line number 2-0 are stored again in accordance with a ratio of the encoder count number to the total count number (23/222): X1=1.1 is rewritten to X1=1.104 and X2=1.1 to X2=1.104.

In line number 2-1, according to a ratio of the encoder count number to the total count number (23/222), the feeding distance X is rewritten: X1=1.2 to X1=1.207 and X2=1.2 to X2=1.207.

Next in the line number 2-2, according to a ratio of the encoder count number to the total number (22/222), the feeding distance X is rewritten: X1=1.3 to X1=1.306 and X2=1.3 to X2=1.306.

The same correction process continues to line number 2-9 in the detection table. The next correction process is started when the next article detection sensor detects the leading end of the article W starting with the line number 2-9 and it continues until the side detection sensor 29 detects the tail end of the article W.

According to the distance between the article detection sensors the article W is fed through, the feeding distance X (coordinates X1, X2) is stored again in the memory with a ratio of the encoder count number for each line to a total count number of the encoder, whereby the outline of the article fed in the distances between article detection sensors can be corrected on the actual feeding trajectory.

As another correction method, distance X corresponding to the distance between sensors can be calculated by using a ratio of an accumulated count number of each line to a total count number. Either method yields the same correction results.

The count numbers of the pulse encoders 26 and 27 are needed to be selectively used because the feeding distance X is calculated by the count number of the encoder that outputs pulse signals synchronized with the movement of the conveying means corresponding to the article detection sensors for detecting the moving article W. Which count number of the pulse encoders 26 and 27 is selected and used is determined by judging which one of the conveying means arranged at both sides of the side detection sensor 29 bears approximately half of the total length of the article W from the leading end to the tail end detected by the side detection sensor 29. The judgment of which count number to select and use is not limited to the judgment by length as described above. Fluctuations of a load applied to the conveying means or the number of the article detection sensors shaded by the article W can be used to judge which count number of the pulse encoders to select and use.

6. When the tail end of the article W is detected by the side detection sensor 29, dimensioning of one article is completed.

Hereinafter described is the concept and flow of correction of the length the article W with reference to an example of a detection table shown in FIG. 25, and FIGS. 16 and 17.

The detection table shown in FIG. 25 is stored in RAM including detection data of the lateral sides and leading and tail ends of the article W using the side detection sensor 29 located between belt conveyers 24 and 25 detecting the article at regular intervals (e.g. 3 msec), together with corresponding count numbers of pulse encoders 26 and 27 and the locations of the article detection sensors, when conveying the article W from conveyer 24 to conveyer 25 in the apparatus for measuring articles shown in FIG. 14. FIG. 15 is an image view of the detection table shown in FIG. 25, wherein (X1, Y1) and (X2, Y2) represent trajectories (outlines) of the both sides of the article respectively.

Figure 16A:
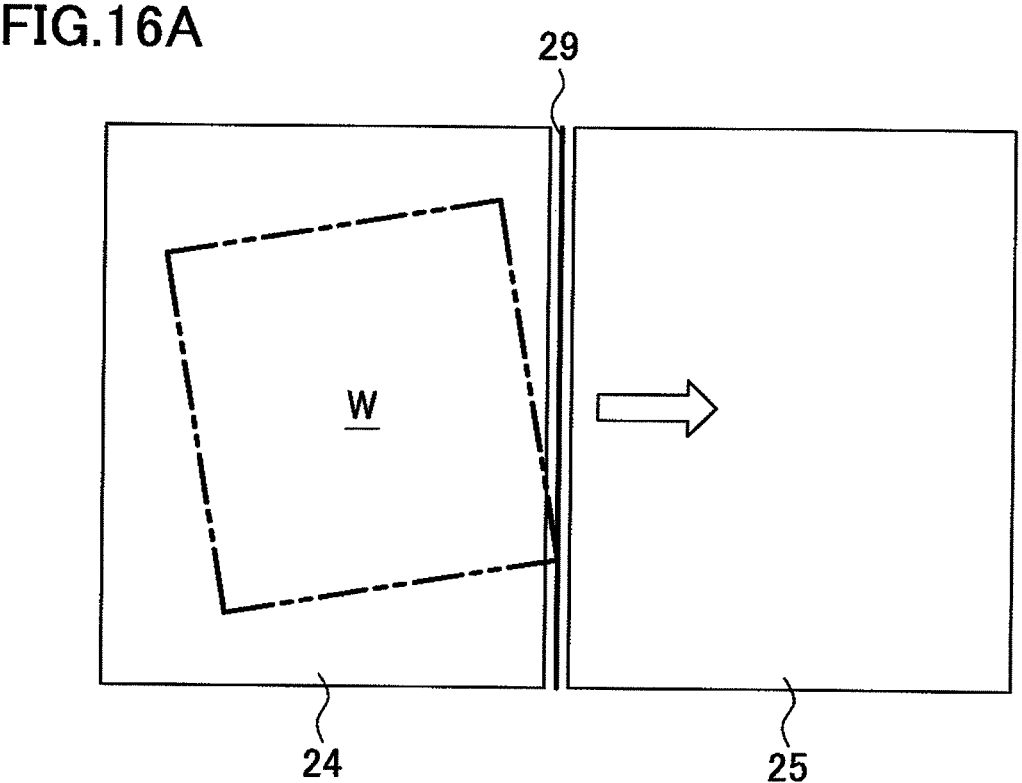
FIG. 16 is a view with no difference in feeding speed of conveyers, wherein (a) is an illustrative view and (b) is an image view of plotted measured values.
Figure 16B:
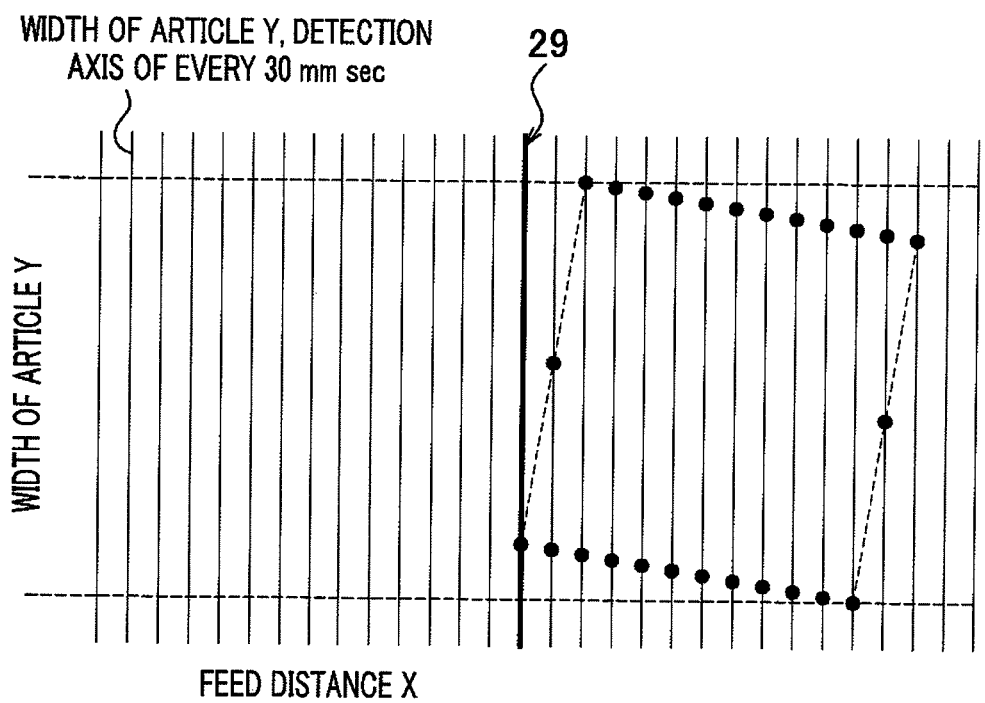

If the feeding speeds of the belt conveyer 24 and 25 conveying the article W are same and the speed errors of both conveyers are zero, the plotted points are substantially aligned as shown in an image view of FIG. 16. The outline of the article W can be drawn by drawing a line passing through the plotted coordinates based on the method of least squares. Specifically, the outline of the article W can be drawn by drawing lines passing through the coordinates (X1,Y1) or (X2,Y2) on the method of least squares to make 4 vertexes representing 4 corners of the article W (dimension calculation part).

Figure 17A:
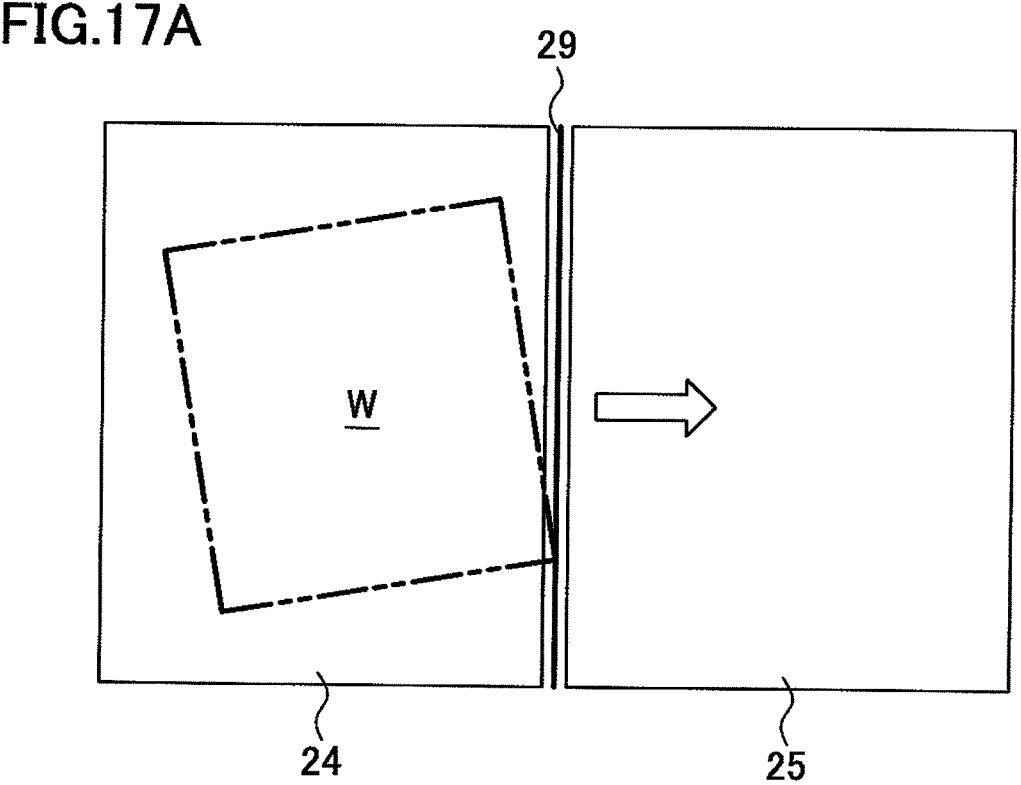
FIG. 17 is a view with a difference in feeding speed of conveyers, wherein (a) is an illustrative view and (b) is an image view of plotted measured values.
Figure 17B:
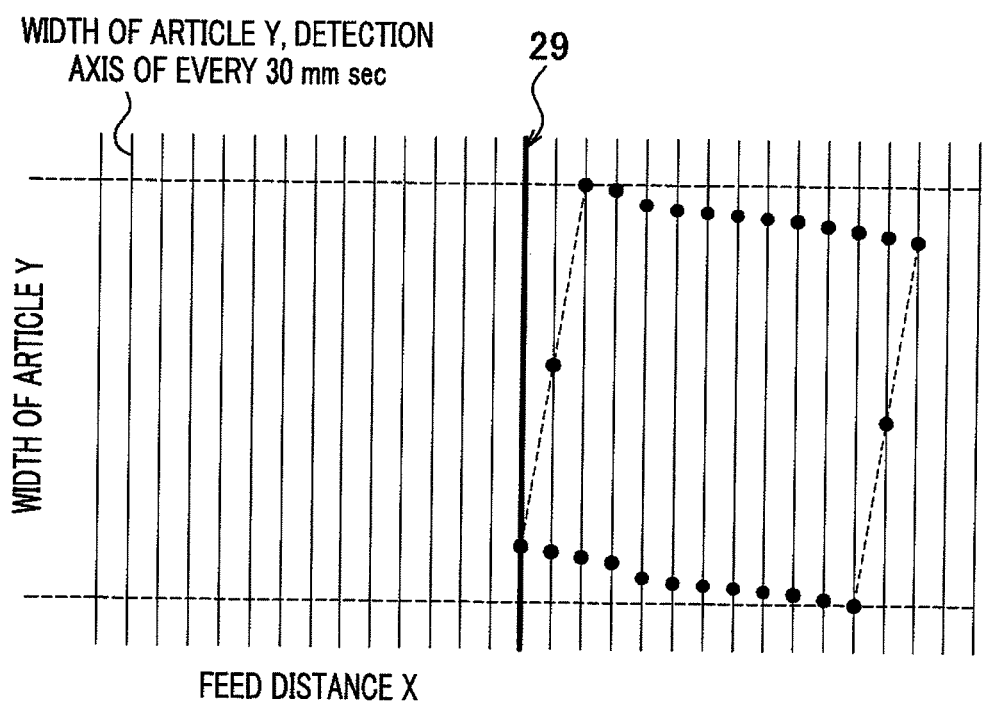
Figure 20:
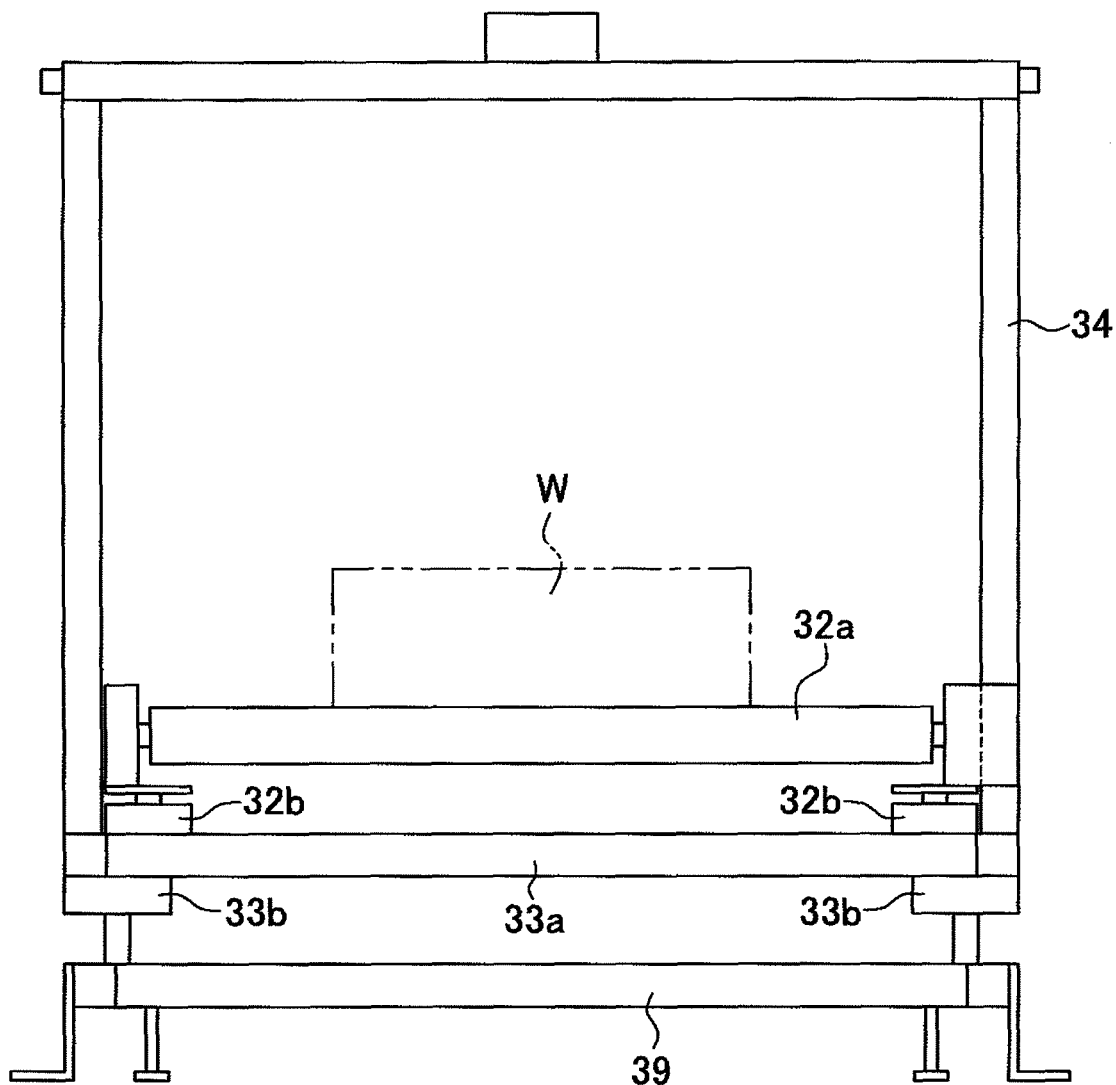
FIG. 20 is a side view of the same.

However, if there is a difference between the speeds of the belt conveyers 24 and 25, for instance the speed of the belt conveyer 24 is slower than that of the belt conveyer 25, the plotted points are not aligned as shown in FIG. 17, and lined unlevel. Or for instance, if the speed of the belt conveyer 24 is faster than that of the belt conveyer 25, a phenomenon occurs that the number of coordinate Y is less than that of coordinate X (The article fast passes through the side detection sensor). More specifically, if the detection data stored time sequentially is used without correction, the exact outline of the object cannot be obtained because external loads and stress have some effect thereon. Therefore, the feeding direction X is calculated for X1 and X2 by using the ratio of the count number corresponding to a distance between the article detection sensors detecting the article W and the calculated feeding direction X is stored again in the detection table, whereby the coordinates can be corrected and plotted closely to the exact outline of the article as shown in an image view of FIG. 16. X-axis and Y-axis in FIGS. 16 and 17 represent feeding distance and both lateral side locations of the article respectively (plotting is aggregated in 30 ms).

Hereinafter, correction will be described.

TABLE 1

| LINE NR. | [COORDINATES MEASURED BY GATE SENSOR] | | | | ENCODER COUNT NR. 1 | ENCODER COUNT NR. 2 |
|---|---|---|---|---|---|---|
| 1 | X1 = 1 | Y1 = 4 | X2 = 1 | Y2 = 4 | | |
| 2-0 | X1 = 1.1 | Y1 = 3.98 | X2 = 1.1 | Y2 = 8.91 | 23 | 22 |
| 2-1 | X1 = 1.2 | Y1 = 3.96 | X2 = 1.2 | Y2 = 8.92 | 23 | 22 |
| 2-2 | X1 = 1.3 | Y1 = 3.95 | X2 = 1.3 | Y2 = 8.93 | 22 | 22 |
| 2-3 | X1 = 1.4 | Y1 = 3.94 | X2 = 1.4 | Y2 = 8.94 | 22 | 22 |
| 2-4 | X1 = 1.5 | Y1 = 3.93 | X2 = 1.5 | Y2 = 8.95 | 22 | 22 |
| 2-5 | X1 = 1.6 | Y1 = 3.91 | X2 = 1.6 | Y2 = 8.96 | 22 | 22 |
| 2-6 | X1 = 1.7 | Y1 = 3.89 | X2 = 1.7 | Y2 = 8.97 | 22 | 22 |
| 2-7 | X1 = 1.8 | Y1 = 3.87 | X2 = 1.8 | Y2 = 8.98 | 22 | 22 |
| 2-8 | X1 = 1.9 | Y1 = 3.85 | X2 = 1.9 | Y2 = 8.99 | 22 | 22 |
| 2-9 | X1 = 2 | Y1 = 3.83 | X2 = 2 | Y2 = 9 | 22 | 22 |
| 3 | X1 = 3 | Y1 = 3.67 | X2 = 3 | Y2 = 16 | | |
| 4 | X1 = 4 | Y1 = 3.49 | X2 = 4 | Y2 = 15.83 | | |
| 5 | X1 = 5 | Y1 = 3.33 | X2 = 5 | Y2 = 15.66 | | |
| 6 | X1 = 6 | Y1 = 3.17 | X2 = 6 | Y2 = 15.49 | | |
| 7 | X1 = 7 | Y1 = 2.99 | X2 = 7 | Y2 = 15.33 | | |
| 8 | X1 = 8 | Y1 = 2.83 | X2 = 8 | Y2 = 15.17 | | |
| 9 | X1 = 9 | Y1 = 2.66 | X2 = 9 | Y2 = 14.99 | | |
| 10 | X1 = 10 | Y1 = 2.49 | X2 = 10 | Y2 = 14.83 | | |
| 11 | X1 = 11 | Y1 = 2.33 | X2 = 11 | Y2 = 14.66 | | |
| 12 | X1 = 12 | Y1 = 2.16 | X2 = 12 | Y2 = 14.49 | | |
| 13 | X1 = 13 | Y1 = 7.80 | X2 = 13 | Y2 = 14.33 | | |
| 14 | X1 = 14 | Y1 = 14 | X2 = 14 | Y2 = 14 | | |

According to Table 1, correction operations are described.

The detection data shown in the detection table of FIG. 25 is aggregated in 30 m sec. The data of line number 1 to 2 of the detection table is shown in line number 2-0 to 2-9 of Table 1 which shows detection data detected every 3 m sec between the article detection sensors before aggregation. The portion is enclosed by a square in Table 1.

Correction operation is described by using the Table 1 showing in detail from line number 1 to line number 2 of the detection table of FIG. 25 in accordance with both lateral side locations (Y1, Y2) stored between the article detection sensors and the corresponding count numbers by encoders. Line number 1 of the Table 1 stores detection data when the side detection sensor 29 detects the leading end of the article W while line number 2-9 stores detection data as the last data between the sensors when the article detection sensor 28c detects the leading end of the article W.

Regarding the detection data from line number 1 to line number 2-9 of Table 1, the feeding distance X (coordinates X1, X2) of the detection table stored in the memory is corrected in accordance with a ratio of the encoder count number of each line to a total count number corresponding to the distance between sensors, and stored again in the memory.

For example, the group of line numbers 1 to 2-9 shown in the Table 1 stored in the memory corresponds to a distance between the side detection sensor and the article detection sensor. The distance between the side-detection sensor and the article detection sensor is defined as 1, thus X1, X2 of the line number 2-0 are stored again in accordance with a ratio of the encoder count number to the total count number (23/222): X1=1.1 is rewritten to X1=1.104 and X2=1.1 to X2=1.104.

In line number 2-1, according to a ratio of the encoder count number to the total count number (23/222), the feeding distance X is rewritten: X1=1.2 to X1=1.207 and X2=1.2 to X2=1.207.

Next in the line number 2-2, according to a ratio of the encoder count number to the total number (22/222), the feeding distance X is rewritten: X1=1.3 to X1=1.306 and X2=1.3 to X2=1.306.

The same correction process continues to line number 2-9 in the detection table. The next correction process is started when the next article detection sensor detects the leading end of the article W starting with the line number 2-9 and it continues until the side detection sensor 29 detects the tail end of the article W.

According to the distance between the article detection sensors the article W is fed through, the feeding distance X (coordinates X1, X2) is stored again in the memory with a ratio of the encoder count number for each line to a total count number of the encoder, whereby the outline of the article fed in the distances between article detection sensors can be corrected on the actual feeding trajectory.

Finally, according to the detection data stored in the detection table shown in FIG. 25, the outline of the article W can be drawn by drawing lines passing through the coordinates (X1, Y1) or (X2, Y2) on the method of least squares to make four lines and the four vertexes representing the four sides and four corners of the article W.

According to the method as described above, dimensions substantially same with the real thing can be obtained even if the conveyed article is a golf bag, etc. with no right angles. Thus, three sides of articles (length, width, height) required for charging can be easily calculated at shipping centers or airports handling such articles.

Embodiment 3

Embodiment 3 is disclosed with reference to FIGS. 18 through 23.

The embodiment is an apparatus combining a dimension measuring device with weighing conveyers, wherein conveying-weighing unit 32 including conveyer 31a for conveying an article W and weighing device 31b for weighing the article fed on the conveyer 31a, and conveying unit 31 having only conveyer 32a for conveying the article W, are configured to rest adjacently in series on weighing unit 33 having only weighing device 33b, whereby articles are conveyed successively in a straight line on the conveyers 31a and 32a.

A side detection sensor (sensor unit) 34 for detecting both sides and longitudinal ends (leading end and tail end) of an article conveyed, is provided between the end portion of the conveying unit 31 and the first portion of the conveying-weighing unit 32. Pulse encoders 35 and 36 generating pulse signals synchronized with the feeding performed by each conveyer are provided in the conveying unit 31 and the conveying-weighing unit 32 respectively. Article detection sensors (photo sensors) 37a to 37h are arranged on the sides of the conveying-weighing unit 32 and the conveying unit 31 at predetermined intervals along a conveying direction to detect the feeding of the article W conveyed from the conveying-weighing unit 32 to the conveying unit 31. Specifically, five article detection sensors 37d to 37h are arranged within the conveying-weighing unit 32 and three article detection sensors 37a to 37c are arranged within the conveying unit 31.

The conveying-weighing unit 32 and the conveying unit 31 have different lengths in their conveyers 31a and 32a (31a>32a) and the conveying-weighing unit 32 having a longer machine length is placed before the conveying unit 31 along the conveying direction. In addition, conveyers 38, 38' are adjacently provided before the conveying-weighing unit 32 and after the conveying unit 31 to carry the article W respectively in and out.

The weighing device 31b for the conveying-weighing unit 32 and the weighing device 33b for the weighing unit 33 include load cells (strain gauges attached to strain-yielding bodies), which have been commonly used for weighing in recent years. The load cells are installed with improved rust-resistance, water-resistance, chemical-resistance, impact-resistance, vibration-resistance and environment-resistance, with circuitry, etc. designed to reduce a temperature drift.

The weighing device 31b is placed under the four corners of the frame of the conveyer 31a, and over support frame 33a of the weighing unit 33.

The weighing unit 33 has a support frame 33a that cannot be deformed by the conveying-weighing unit 32 and conveying unit 31 loaded thereon. The weighing devices 33b are placed under substantially four corners of the support frame 33a. The weighing devices 33b of the weighing unit 33 is placed on a flat upper surface of a base table 39, thus enabling measurement of the total weights of all articles placed and conveyed on the conveying-weighing unit 32 and conveying unit 31.

The side detection sensor 34, as shown in FIG. 21, has a plurality of light-emitting elements 41a arranged at regular intervals on horizontal side part 40a of portal frame 40 facing the conveyer, while light-receiving elements 41b are arranged under the conveying surface and between the conveying-weighing unit 32 and conveying unit 31 so as to face the light-emitting elements 41a. Pairs of the light emitting elements 41a and light receiving elements 41b constitute the detection sensor 41. Thus, the width of the article W orthogonal to conveying direction and both the leading and the tail end of the article W along conveying direction can be detected when the article W is crossing over to the conveying-weighing unit 32 from the conveying unit 31.

Further, the frame 40 includes a pair of vertical side parts 40b and 40c opposite to each other. A plurality of light emitting elements 42a are arranged on the vertical side part 40b at regular intervals vertically from near the conveying surface to the horizontal side part 40a, while a plurality of light receiving elements 42b are arranged on the vertical side part 40c opposite to the respective light emitting elements 42a. Pairs of the light emitting elements 42a and the light receiving elements 42b constitute the detection sensor 42. Thus, the height of the article standing vertically on the conveying surface can be measured when the article W is crossing over to the conveying-weighing unit 32 from the conveying unit 31.

Dimensioning and weighing of the article W using a measuring device configured as described above is controlled by a control panel 43 (console) including a micro computer, etc. near the measuring device.

Figure 22:
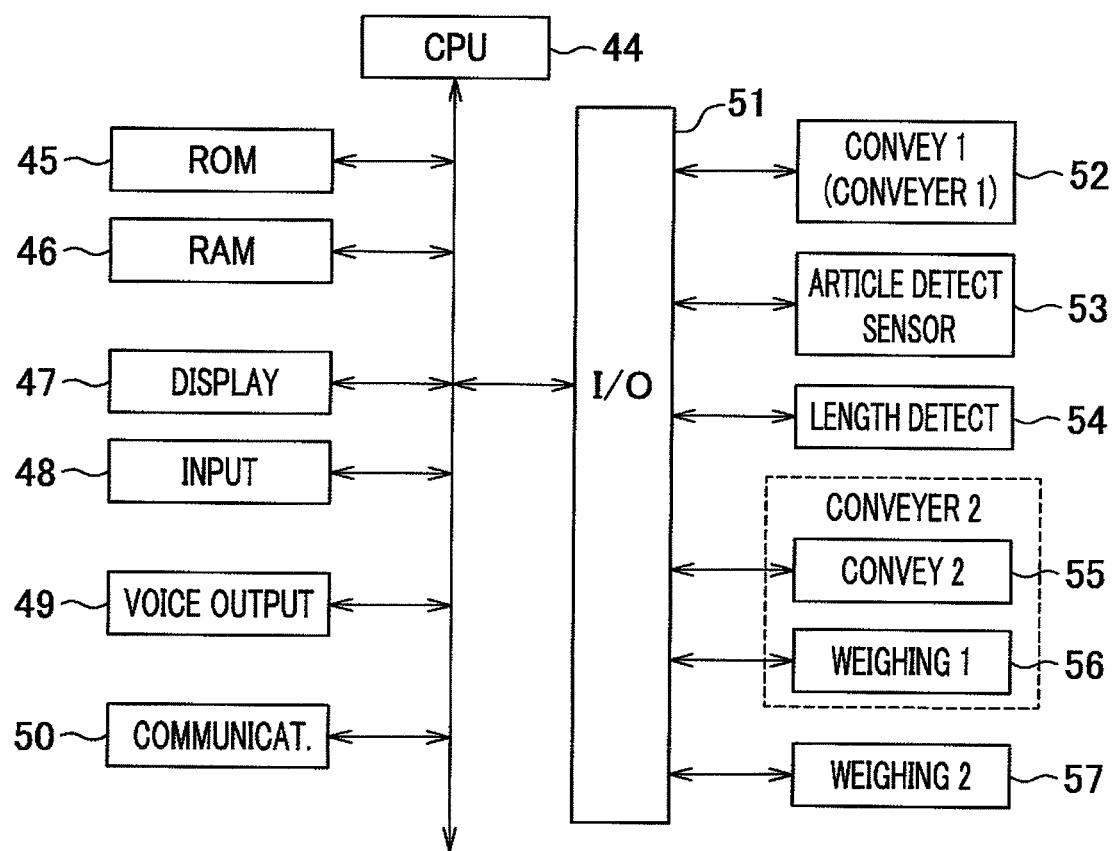
FIG. 22 is a block diagram of FIG. 18.

FIG. 22 is a block diagram showing a control of the measuring device as described above, comprising CPU 44 for controlling operations of conveying-weighing unit 32, conveying unit 31 and weighing unit 33, ROM 45 for storing a control program, RAM 46 for storing weighing values measured by the weighing devices 31b and 32b of conveying-weighing unit 32 and weighing unit 33, output values and measured values from the detection sensors 41, 42 of the side detection sensor (sensor unit) 34 and including work area for calculating weight, etc., display 47 for displaying dimensions and weight of the article W, information about the article W conveyed by conveyers 31a, 32a, etc., input operation part 48 for maintaining the weighing devices 31b, 33b and inputting preset data, voice output part 49 (alarm device) for alarming errors and emergencies, communication part 50 for communicating data with higher-level devices, article detection sensor 53 (photo sensors 37a to 37h) configured with pairs of light-emitting elements and light-receiving elements for detecting moving articles, length detection part 54 (side detection sensor 34) for detecting width and height of the article W, conveying part 55 (conveyer 32a) of conveying-weighing unit 32 for carrying the article W, weighing part <1> 56 (weighing device 32b) for measuring the weight of the article W placed on the conveying-weighing unit 32, weighing part <2> 57 (weighing device 33b) for measuring the weight of the article W placed on the conveying unit 31 or both on the conveying-weighing unit 32 and conveying unit 31, etc. The weighing parts 56, 57 include an A/D converter. Further, the alarm device is equipped with a red flasher, etc. in addition to the voice output part. The red flasher is attached to the frame 40, which is equipped with the length detection means (side detection sensor 34).

Figure 23:
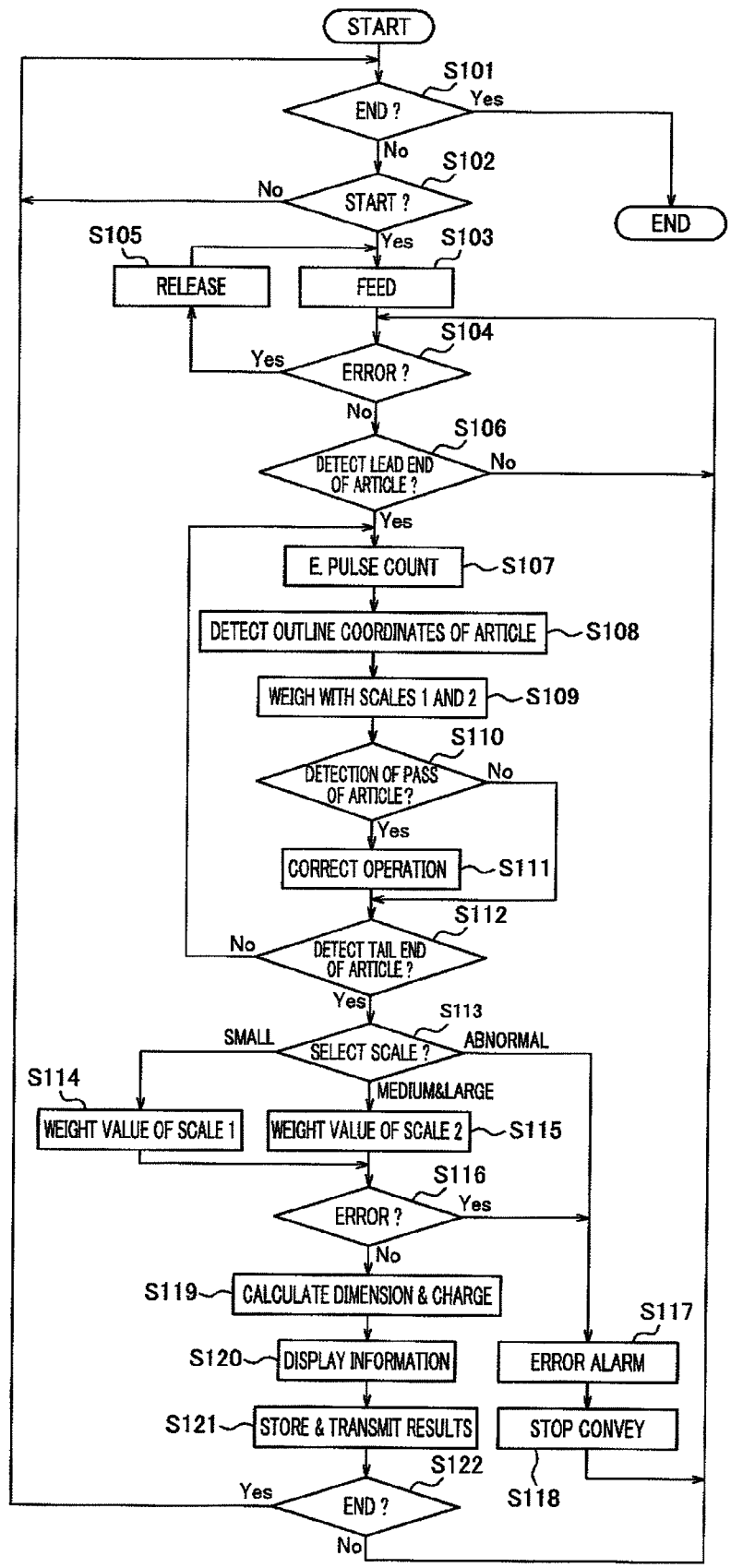
FIG. 23 is a flowchart of measuring an article.

FIG. 23 is a flowchart showing a measurement operation of weight and length of a carried article by the dimension-measuring device.

S101: A program judges whether or not to terminate. A judgment is made as to whether "termination" is displayed in a display or "termination button" of an input operation part is pressed. If pressed (Yes), the program goes to an end, otherwise (No) it goes to step S102. Power off can be the end of an operation regardless of whether "termination" is pressed.

S102: The start of operation is judged. Specifically, a judgment is made as to whether "start" is displayed in a display or "start button" of the input operation part is pressed. If pressed (Yes), program goes to S103, otherwise (No), it goes back to step S101. Power-on can be the start of an operation regardless of whether "start" is pressed.

S103: The conveyer 31a of the conveying-weighing unit 32 and the conveyer 32a of the conveying unit 31 start to move.

S104: The presence of an error state is judged. Specifically, incapabilities or errors are judged for each weighing device of the conveying-weighing unit 32 and the weighing unit 33, the conveyers of the conveying-weighing unit 32 and the conveying unit 31, article detection sensors 37a to 37h and side detection sensor (sensor unit) 34. If any error is detected (Yes), the error is explained in a display and the program goes to step S105. If error is not detected (No), the program goes to step S106.

S105: It is judged whether "removal" is shown in a display or a "removal button" in the input operation unit is pressed. If the "removal button" is pressed, the program goes back to step S103. In case of errors due to some physical causes, the "removal button" preferably is not be pressed unless countermeasures are taken by an operator.

S106: It is judged whether the leading end of the article W is detected by the side detection sensor 34 (gate sensor). If the leading end is detected (Yes), the program goes to step S107, and if not (No), it goes back to step S104.

S107: Output pulses from the pulse encoders 35, 36 are counted.

S108: Coordinates of both sides of the moving article W are detected by the side detection sensor 34 (gate sensor) and the height of the article W is detected by photo sensors, and the detected data is stored in a detection table (see FIG. 25) of RAM 46. (FIG. 25 does not show the detected height data) Further, the count numbers of the pulse encoders 35, 36 are stored in the detection table of the RAM 46.

The time interval of detection (e.g. 3 m sec) varies according to a feeding speed of the conveying means (belt conveyer). The feeding speed of the conveying means can be set during a maintenance mode and stored in a condition setting area of the RAM 46.

S 109: The weight of the article W is measured by the weighing device 10b of the conveying-weighing unit 32 (weighing part <1> 56) and weighing device 33b of the weighing unit 33 (weighing part <2> 57), and the measurement results are stored as data in a weight storing area of the RAM 46. More specifically, the data is stored in respective weight storing areas assigned by each line number of the detection table to the corresponding weighing parts <1> and <2>.

S110: Positions of the article W carried by the conveyers 31a, 32a are detected by article detection sensors 37a to 37h for detecting the leading and tail ends of the article W. Specifically, the sensors 37a to 37h (photo sensors) arranged along the conveying-weighing unit 32 and conveying unit 31 detect a passing of the article W. Detection of a passing means that the article detection sensors 37a to 37h (photo sensors) detect sequentially the leading and tail ends of the article W. When the article detection sensors 37a to 37c arranged downstream to the side detection sensor 34 (gate sensor) are on (non-detection), no carried article W is judged to have passed, and the program goes to step S112; and when the article detection sensor 16c switches off (detection), the carried article W is judged to have passed, and the program goes to step S111. A passing of the article W can be detected by detecting ON/OFF of respective sensors arranged at regular intervals by using two or more article detection sensors.

S111: When any one of the sensors 37a to 37h detects the article W and then the next sensor detects the same a value of a feeding distance X of the article W (coordinates X1,X2) is corrected and stored again in the detection table in accordance with a ratio of each count number of the pulse encoder to a total count number counted during the article W passing from one sensor to another based on the locations (Y1, Y2) of the lateral sides of the article W and the count number of either pulse encoder 35 or 36 stored in a detection table (FIG. 25) in the RAM 46.

If the length of the article W is long enough to cover the conveying-weighing unit 32 and conveying unit 31, correction is performed each time the article detection sensors 37c, 37b and 37a arranged within the conveying unit 31 (right side of conveying direction shown in FIG. 18) turn off (detection of the leading end), while correction is performed each time the article sensors 37d to 37h arranged within the conveying-weighing unit 32 turn on (detection of the tail end) in the case that the article detection sensor 37a is off (detection) and any one of sensors 37d to 37h arranged within the conveying-weighing unit 32 (left side of conveying direction shown in FIG. 18) is off (detection).

Either one of the pulse encoders 35 and 36 is selected to use its count number. Switching of the pulse encoders depends on the number of the article detection sensors shaded by the article W. Alternatively, the pulse encoders may be switched depending on a fluctuation of a load applied to the conveying devices or which one of belt conveyers arranged at both sides of the side detection sensor 34 bears approximately half of the total length from the leading end to the tail end of the article W detected by the side detection sensor 34.

S112: Whether the side detection sensor 34 (sensor unit) detects the tail end of the article W is judged. If yes, based on a known distance between article detection sensors detecting the tail end, the outline coordinates of the article W are corrected in accordance with a ratio of each count number of the encoder to a total count number of the encoder counted corresponding to a distance between sensors detecting the tail end, and the program goes to step S113. If not, the program goes back to step S107.

S113: A weight value of the carried article W is determined by selecting a measured value from the weight storing area of the RAM 46 for storing the measured values by the weighing means 31b and 33b, according to the length of the article W calculated based on a count number of the pulse encoders 35 and 36 during the time when the side detection sensor 34 (sensor unit) detects the article W from the leading end to the tail end.

In this determination, for example, if the calculated length of the article W is 440 mm or less, the program goes to step S114, and if the length of the article W is no less than 441 mm and no more than 1050 mm or no less than 1051 mm, the program goes to step S115. Further, if errors occur when dimensioning and weighing or the measured weight values are abnormal, the occurrence of errors and its causes are stored in a work area of the RAM 46 and the program goes to step S117. Either the weighing device 31b or 33b is selected according to weighing means selection data preliminarily stored in the RAM 46.

S114: If a small (short) article is carried, the measured value of the weighing device 31b (weighing part <1> 56) is selected from the weight storing area of the RAM 46, and the weight is calculated based on the measured value. Then the program goes to step S116.

Weighing of a plurality of articles fed in series can be separated according to a cycle variation for each article, based on a length of time for the article to pass one of the sensors (a time from ON to OFF) for detecting the length, feeding speed and measured values of the weighing device 31b sequentially stored in the RAM 46. Thus, the weight of each carried article is determined in series on the basis of the conventional method of "moving average" applied to each separated measured value.

S115: Since a medium/large sized article is carried, the measured value of the weighing device 33b (weighing part <2> 57) is selected from the weight storing area of the RAM 46, and the weight is calculated based on the measured value, and then the program goes to step S116.

Weighing of a plurality of articles fed in series can be separated according to a cycle variation for each article, based on a length of time for the article to pass one of the sensors (a time from ON to OFF) for detecting the length, feeding speed and measured values of the weighing device 33b sequentially stored in the RAM 46. Thus, the weight of each carried article is determined in series on the basis of the conventional method of "moving average" applied to each separated measured value.

A weight of 50 kg is calculated based on the value of the weighing device 33b of the weighing unit 33 (weighing part <2> 57) shown in FIG. 25.

S116: A judgment is made as to whether or not any errors occur during the time of measuring, conveying, calculating or operating or as to whether any errors exist in various kinds of sensors based on the stored error data in the work area of the RAM 46. If it is judged that an error exists (YES), then the program goes to step S117; if it is judged that no error exists (NO), then the program goes to step S119.

S117: Descriptions of errors are shown in a display 47.

S118: The movements of the conveyers 31a and 32a are stopped, and then the program goes back to step 104.

S119: Based on the detection data regarding the article W corrected and again stored in the detection table (see FIG. 25), a least-square method is applied to the lines passing through (X1, Y1) or (X2, Y2) to draw lines forming four sides of the article W, making four corners of the article W with four intersection points of the respective lines. As a quadrangle gradient changes gradually, the product of each length in X direction and Y direction of the four points is continually calculated. Then, the dimensions of the article (length and width) are determined by the length in the X and Y directions based on a gradient with the least product value. The height is also calculated during this operation. In this way, freight charges, for example, can be calculated based on the dimensions and the weight of the article as determined above, at courier centers, air ports, etc.

S120: The dimensions (length, width, height), the weight and the charge of the article W are shown in the display 47 of the console 43. Data is displayed as needed in a 2-D table, including a feeding order, item designations like "dimensions," "weight" and "charge," etc. and corresponding values concerning the article W.

A changing weight is continually displayed as the article is fed on a conveyer. When a weight is calculated and determined, the determined weight is fixed in the display. An outline of the article (non-cuboid is converted to cuboid) is displayed as a perspective view as the article passes through the side detection sensor.

S121: The result is stored in a result storing area of the RAM 46 and sent to an upper management device. If results are constantly sent to the upper management device, they may not be required to be stored in the result storing area.

S122: Judgment is made as to whether the operation is completed or suspended. If the operation is completed or suspended (YES), the program goes back to step S101, if not, it goes back to step S104.

The weight of an article on the conveying-weighing unit 32 can be calculated by subtracting the weighing data of the conveying unit 31 from the weighing data of the weighing unit 33 on the condition that a plurality of articles with different lengths are carried in succession and they are within the machine length of the conveying unit 31 and conveying-weighing unit 32 without covering both devices.

Embodiment 4

Figure 24:
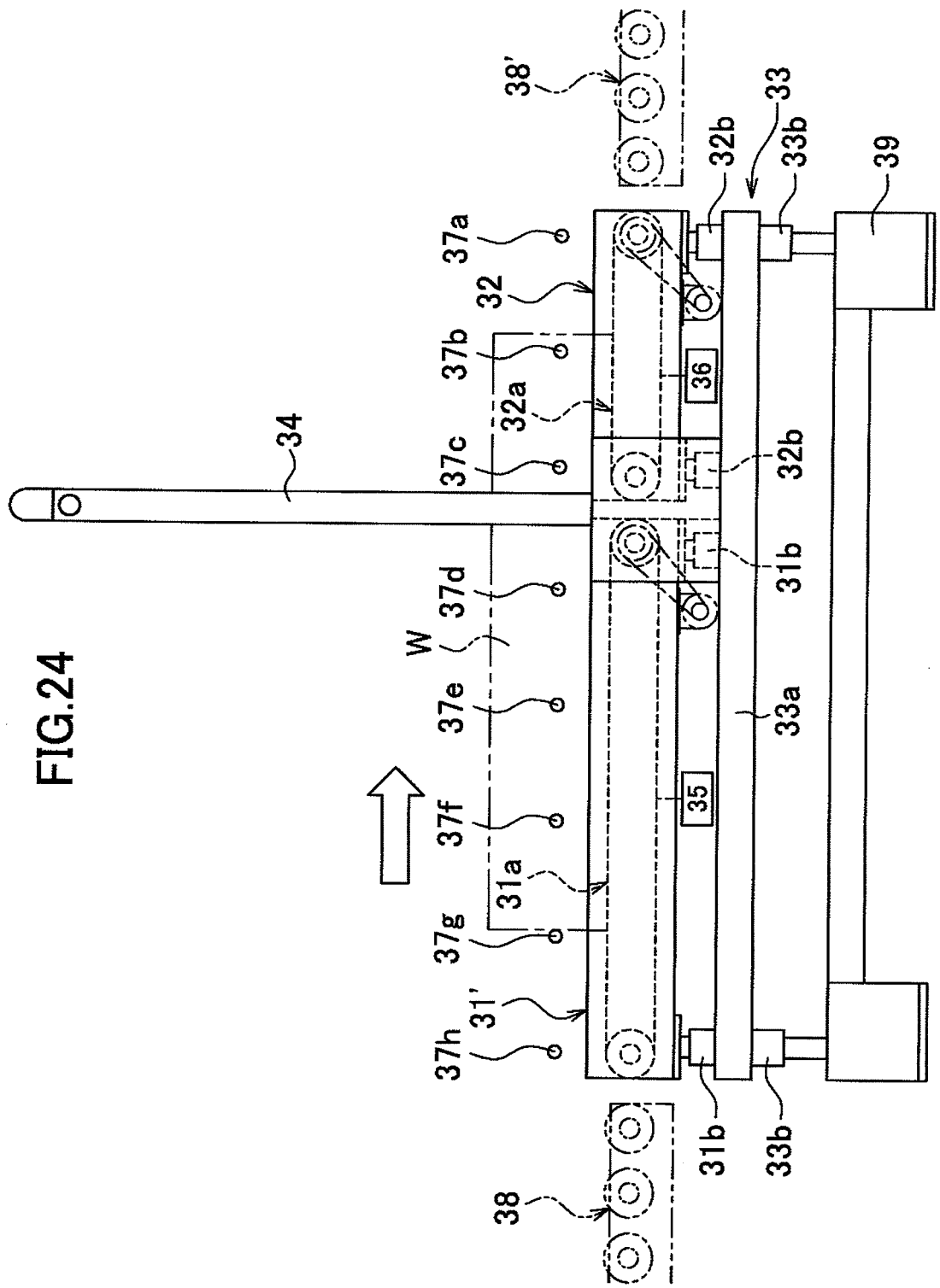
FIG. 24 is a front view of an apparatus for measuring an article used in a manner in accordance with another embodiment of the invention.

FIG. 24 shows a conveying-weighing unit 31' corresponding to the conveying unit 31 located and supported by the weighing unit 33 shown in the embodiment 3. The apparatus shown in this embodiment is different from the apparatus shown the embodiment 3 only in that the conveying-weighing unit 31' has a weighing device 31b. The same symbols are used for the same members shown in the third embodiment to curtail descriptions.

When conveying the article W on the apparatus defined above, if the length of the article W is within the conveying-weighing unit 32, the weighed value by the weighing device 32b of the conveying-weighing unit 32 is adopted. If the length of the article W is longer than the machine length of the conveying-weighing unit 32 and within the machine length of the conveying-weighing unit 31', then the weighed value by the weighing device 31b of the conveying-weighing unit 31' is adopted. Further, if the length of the article W is longer than the machine length of the conveying-weighing unit 31', then the weighed value by the weighing device 33b of the weighing unit 33.

Thus, with reference to the flowchart of FIG. 23 showing the measuring operation of the embodiment 3, if the length of the article W is judged "small" "medium" or "large", the weighing device 32b, 31b and 33b are selected respectively. More specifically, step S 113 are bifurcated to three scales, weights are measured by the three scales respectively.

According to Embodiments 3 and 4, correct weights can be measured because even if the article W is conveyed over the conveying unit 31 (or the conveying-weighing unit 31') and the conveying-weighing unit 32 as described above, which does not affect the stress on the weighing device 33b of the third weighing unit 33 supporting these units 31 (or unit 31') and unit 32. In addition, Embodiment 3 can reduce the number of the weighing devices (load cells), thus comparing with Embodiment 4, Embodiment 3 can reduce the cost of the apparatus.

The invention is not limited to Embodiments as shown in the drawings and can be appropriately modified without departing from the scope of the invention.

1) Embodiments can use not only load cells having strain gauges attached to strain-yielding bodies, but load meters using electromagnetic balance type, metal tuning fork vibration type, string vibration type, capacitance type, piezoelectric type, magnetostrictive type, gyro type or hydraulic type.

2) Embodiments show measuring the length of an article by using photo-sensors as a side detection sensor for measuring the length of the article, based on a detection time (from ON to OFF of the detection sensor) and the feeding speeds of conveyers. Not limited to the side detection sensor described above, the length of the article can be measured by a plurality of photo sensors arranged along the conveying path of the article.

3) Embodiments show two conveying-weighing units, or one conveying unit and one conveying-weighing unit arranged in series over a weighing unit supporting these conveying-weighing unit(s) or conveying unit. The total number of the conveying-weighing unit and conveying unit arranged over the weighing unit is not limited to two. Three and more such units can be arranged over the weighing unit.

4) A table like the scale selection information can be stored not only in RAM, but be included in a computer program.

5) Embodiments show outputting both lateral side locations of an article as coordinates (X1, Y1) and (X2, Y2) by using a side detection sensor (gate sensor). Instead, a computer can output both lateral side locations of the article as distances from a reference axis (X-axis) parallel to the feeding direction to both lateral side locations in a direction (Y-axis) orthogonal to the reference axis.

6) Embodiments show correcting the dimensions of an article based on the count numbers of pulses generated synchronized with feeding of conveyers by pulse generating devices. Not limited to using the pulse generating devices, a computer can store in a memory the both lateral side locations based on signals detected in regular intervals by the side detection sensor (location data) and the number of the detection in accordance with a ratio of the detection number to a distance between article detection sensors.

The modification makes it possible to obtain correct dimensions without devices like encoders and reduce the number of parts and the cost of the apparatus.

7) Embodiments show correcting both lateral side location data of an article detected by the side detection sensor and storing again the corrected data in a memory by correcting feeding direction X in accordance with a ratio of the count number to a distance between article detection sensors every time the next article detection sensor detects the leading or tail end of the article after one article detection sensor detects the leading or tail end of the article. Instead, a computer can store successively in a memory both locations of leading and tail ends of respective articles W successively fed by conveyers, together with encoder count numbers and locations of article detection sensors and correct dimensions of the fed article W as a whole based on the locations of both leading and tail ends of the article W, the encoder count number and the locations of the article detection sensors when the gate sensor detects the tail end of the article W. In this way, the computer can obtain the outline and the dimensions of a plurality of small-sized or large-sized successively conveyed articles W instantly and correctly.

8) Embodiments show storing in the detection table detections of side detection sensor 29 together with count numbers of pulses generated by pulse encoders. Instead, a computer can store separately in RAM 46 the detection table and the pulse encoder count table (not shown) by performing separately in parallel detections of both lateral side locations of article W by side detection sensor 29 and counting pulses pulse encoders generate.

Specifically, the computer counts pulse signals generated by pulse encoders 26 and 27 between respective article detection sensors with reference to the leading end of the article W conveyed independently from the detection by the side detection sensor 29, and performs simultaneously in parallel a "leading-end reference" storing the lead end of an article together with the locations of article detection sensors and a "tail-end reference" counting pulses based on the tail end of the article W, thus storing respective count numbers of "leading-end reference" and "tail-end reference" in respective encoder count tables in RAM 46.

The "leading-end reference" stores in lead-end reference area in RAM 46 the locations of the article detection sensors the lead end of the article W passes through and encoder count numbers between the article detection sensors, every time the lead end of the article W passes through the respective article detection sensors in accordance with detections of the article W by the side detection sensor 29 (gate sensor). When the side detection sensor 29 (gate sensor) detects the leading end of the article W, the "leading-end reference" stores starting point (starting point flag) in the lead-end reference area and when the side detection sensor 29 (gate sensor) detects the tail end of the article W, the "leading-end reference" stores ending point (ending point flag) in the lead-end reference area.

The "tail-end reference" stores in tail-end reference area in RAM 46 the locations of the article detection sensors the tail end of the article W passes through and encoder count numbers between the article detection sensors, every time the tail end of the article W passes through the respective article detection sensors in accordance with detections of the article W by the side detection sensor 29 (gate sensor). When the side detection sensor 29 (gate sensor) detects the lead end of the article W, the "tail-end reference" stores starting point (starting point flag) in the tail-end reference area and when the side detection sensor 29 (gate sensor) based on the encoder count numbers between the respective sensors i (ending point flag) in the tail-end reference area.

From the respective memory areas of the lead-end and the tail-end reference in the encoder count table of RAM 46 the computer reads the encoder count numbers and the detection table storing both lateral side locations of the article W detected by the side detection sensor 29 and arranges each value (detection data) at the starting point (starting point flag) of detecting the leading point of the article W in a work area of RAM 46. If the leading end of the article W is inside of article detection sensor 28a and the tail end of the article W is inside of conveyer 24 when using encoder count number of "leading-end reference" at first, it is switched to encoder count number of "tail-end reference" between the article detection sensors having the tail end of the article W therein.

According to the switching, based on the encoder count numbers between the respective sensors, both lateral sides of the article W are corrected and stored again in accordance with distances between the respective sensors and the feeding distance X of the article W is corrected and stored again in accordance with an appropriate ratio of the encoder count numbers. Either pulse encoder 26 or 27 is selected for use depending on the "reference" which has a half of the article W from its detected leading end to the tail end.

By using the method described above, the outline of an article and conveying direction X of the article can be corrected and stored again when the feeding speeds of conveyers are unstable or the conveyed article is slipped on the conveyers, whereby the correct dimensions of the article can be obtained.

9) Weighing unit [1] can be placed in the side of conveyer 24 instead of conveyer 25.

10) Pulse encoders are not limited to those measuring the belt speeds of conveyers 24 and 25. They can be connected to the driving motors of the conveyers 24 and 25 as well.

The invention claimed is:

1. An apparatus for measuring articles comprising:
a weighing unit that is positioned on a base and that outputs a weight value;
a conveying assembly comprising a plurality of conveyers supported on the weighing unit, the conveyers positioned adjacent to each other in series for successively conveying articles along a straight line;
a plurality of measurers that measure a weight and a dimension of respective articles successively conveyed by the conveying assembly and that output a value; and
a determiner that determines the weight of respective articles based on the values measured by the plurality of measurers.

2. The apparatus for measuring articles according to claim 1, wherein the plurality of the measurers include a plurality of weighers for weighing the respective articles while the articles are being conveyed by the plurality of the conveyers,
wherein the conveying assembly includes:
a plurality of conveyers-weighers arranged on the weighing unit, each conveyer-weigher including a weigher and a conveyer adjacent to the weigher, the conveyers of the plurality of conveyers-weighers being configured to convey the articles successively in a straight line, and
a sensor that measurers a length of the respective articles conveyed by the conveyers,
wherein the determiner includes a selector that selects one of the values output respectively from the plurality of conveyers-weighers and the weighing unit based on the length of the respective articles measured by the sensor.

3. The apparatus for measuring articles according to claim 1, wherein the plurality of the measurers include a plurality of weighers for weighing the respective articles while the articles are being conveyed by the plurality of the conveyers, wherein
the conveying assembly includes:
a conveyor and a conveyer-weigher arranged on the weighing unit adjacent to each other in series and configured to convey the articles successively in a straight line, the conveyer-weigher comprising a conveyer and a weigher, and
a sensor that measures the length of the respective articles conveyed by the conveyer and the conveyer-weigher,
wherein the determiner includes a selector for selecting one of the values respectively output from the conveyer-weigher and the weighing unit according to the length of the respective articles measured by the sensor.

4. The apparatus for measuring articles according to claim 2, wherein the sensor is arranged between the conveyer-weighers.

5. The apparatus for measuring articles according to claim 3, wherein the sensor is arranged between the conveyer and the conveyer-weigher.

6. An apparatus for measuring articles comprising:
a weighing unit that outputs a weight value;
a conveying assembly comprising a plurality of conveyers, the conveyers positioned adjacent to each other in series for successively conveying articles along a straight line;
a plurality of measurers that measure a weight and a length of respective articles successively conveyed by the conveying assembly and that output a value; and
a determiner that determines the length of respective articles based on the values measured by the plurality of measurers, wherein the plurality of measurers include:
a plurality of article detection sensors arranged at predetermined intervals along the conveying direction of the conveying assembly to detect the articles conveyed by the conveying assembly,
a width sensor that detects locations of both lateral sides of each of the articles as width data of each of the articles being conveyed and
a memory that stores locations of the lateral sides of an article based on signals detected at regular time intervals by the width sensor during a time from a detection of the article by a first article detection sensor until a detection of the same article by a second successive article detection sensor corresponding to a distance between the first and second article detection sensors, until the width sensor no longer detects the lateral sides of the article, and
the determiner includes a length calculator that calculates an outline data of the article based on the data stored in the memory and each distance between the article detection sensors and that calculates the length of the article based on the outline data.

7. The apparatus for measuring articles according to claim 6, wherein the conveying assembly further includes a generator that generates pulse signals synchronized with the movement of the conveyers and a counter that counts the pulse signals,
wherein the counter counts the pulse signals during the time when the width sensor detects an article and stores in the memory, the locations of both lateral sides of the article corresponding to the counted number of the pulse signals based on the distance between the first and second article detection sensors, every time an article detection sensor detects the article.

8. The apparatus for measuring articles according to claim 6, wherein the width sensor includes a height-detection sensor for detecting heights of articles conveyed by the conveying assembly.

9. The apparatus for measuring articles according to claim 6, wherein the conveying assembly includes:
a plurality of conveyer-weighers, each having a conveyer for conveying articles and a weigher arranged over the weighing unit, adjacent to one another in series to convey articles successively in a straight line and
a selector that selects a value output from one of the plurality of conveyer-weighers and the weighing unit according to the value measured by the width sensor.

10. The apparatus for measuring articles according to claim 6, wherein the conveying assembly includes:
a conveyer-weigher having a conveyer for conveying articles and a weigher, the conveyer-weigher further having a conveyer with no weigher, the conveyer-weigher arranged over the weighing unit, adjacent to one another in series to convey articles successively in a straight line and
a selector that selects a value output from one of the conveyer-weigher and the weighing unit according to the value measured by the width sensor.

11. The apparatus for measuring articles according to claim 9, wherein the plurality of conveyer-weighers include first and second conveyer-weighers and the width sensor is arranged between the first and second conveyer-weighers.

12. The apparatus for measuring articles according to claim 10, wherein the width sensor is arranged between the conveyer-weigher and the conveyer.

13. A method of measuring articles comprising:
positioning a weighing unit on a base, the weighing unit outputting a weight value,
conveying articles successively in a straight line by a plurality of conveyers arranged adjacent to each other in series, and supported on the weighing unit,
measuring a weight and a dimension of the respective articles conveyed by the conveyers using a plurality of measurers, and
determining the weight of the respective articles based on the values measured by the plurality of the measurers.

14. The method of measuring articles according to claim 13, wherein the plurality of measurers include a plurality of weighers and the method of measuring articles includes:
weighing respective articles being conveyed by the conveyers using the plurality of weighers,
successively conveying articles along a straight line by the plurality of conveyers arranged adjacent to each other in series over the weighing unit supporting one of the plurality of weighers,
measuring a length of the respective articles conveyed by the conveyers using a sensor, and
selecting, according to the length of the respective articles measured by the sensor, one of values respectively output from the plurality of weighers and the weighing unit.

15. A method of measuring articles comprising:
outputting a weight value by a weighing unit,
conveying articles successively in a straight line by a conveying assembly which comprises a plurality of conveyers arranged adjacent to each other in series, measuring by a plurality of measurers, a weight and a length of the respective articles successively conveyed by the conveying assembly, the plurality of measurers outputting a value, determining by a determiner, the length of the respective articles based on the values measured by the plurality of the measurers, wherein the measuring includes:

detecting an article conveyed by the plurality of conveyers using a plurality of article detection sensors arranged at regular intervals along the moving direction of the conveyers, detecting locations of both lateral sides of each of the articles as width data of each of the articles conveyed by the plurality of conveyers using a width sensor, and storing, in a memory, the locations of the lateral sides of the article based on signals detected at regular time intervals by the width sensor during a time from a detection of the article by a first article detection sensor until a detection of the same article by a second successive article detection sensor corresponding to a distance between the first and second article detection sensors, until the width sensor no longer detects the lateral sides of the article, wherein the determining includes:

calculating an outline data of the article based on the data stored in the memory and each distance between the article detection sensors, and calculating the length of the article based on the outline data.

16. The method of measuring articles according to claim 13, wherein the plurality of measurers include a plurality of weighers for weighing the respective articles while the articles are being conveyed by the plurality of the conveyors, the conveying comprising arranging a conveyor and a conveyor-weigher on the weighing unit adjacent to each other in series and conveying the articles successively in a straight line, the conveyor-weigher comprising a conveyor and a weigher, measuring, by a sensor, a length of the respective articles conveyed by the conveyor and by the conveyor-weigher, wherein the determining comprises selecting one of the values respectively output from the conveyer-weigher and from the weighing unit in accordance with the length of the respective articles, as measured by the sensor.

17. The method of measuring articles according to claim 13, wherein the plurality of measurers include a plurality of weighers for weighing the respective articles while the articles are being conveyed by the plurality of conveyors, the conveying comprising arranging a plurality of conveyors-weighers on the weighing unit, each conveyor-weigher including a weigher and a conveyor adjacent to the weigher, the conveyors of the plurality of conveyor-weighers being configured to convey the articles successively in a straight line, measuring, by a sensor, a length of the respective articles conveyed by the conveyors, wherein the determining comprises selecting one of the values output respectively from the plurality of conveyor-weighers and the weighing unit based on the length of the respective articles, as measured by the sensor.

* * * * *